US008180117B2

(12) United States Patent
Tsuruta

(10) Patent No.: US 8,180,117 B2
(45) Date of Patent: May 15, 2012

(54) INDIVIDUAL IDENTIFICATION DATA REGISTER FOR STORING COMPONENTS AND PROJECTION MATRICES

(75) Inventor: Hirofumi Tsuruta, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 993 days.

(21) Appl. No.: 12/116,656

(22) Filed: May 7, 2008

(65) Prior Publication Data

US 2008/0304717 A1 Dec. 11, 2008

(30) Foreign Application Priority Data

Jun. 7, 2007 (JP) ................................. 2007-151961

(51) Int. Cl.
*G06K 9/00* (2006.01)
*G06K 9/46* (2006.01)
*G05B 19/00* (2006.01)
(52) U.S. Cl. ....... 382/118; 382/190; 340/5.53; 340/5.83
(58) Field of Classification Search .................. 382/118, 382/190; 340/5.53, 5.83
See application file for complete search history.

(56) References Cited

U.S. PATENT DOCUMENTS

| 5,550,928 A * | 8/1996 | Lu et al. ......................... 382/116 |
| 7,734,072 B2 * | 6/2010 | Yamaguchi ................... 382/118 |
| 2001/0026631 A1 | 10/2001 | Slocum et al. |
| 2008/0273761 A1 | 11/2008 | Kawata |
| 2008/0279424 A1 * | 11/2008 | Berrani et al. ................ 382/118 |

FOREIGN PATENT DOCUMENTS

| JP | H11-502344 A | 2/1999 |
| JP | 2006-236244 | 9/2006 |
| WO | WO-2005-122093 A1 | 12/2005 |

* cited by examiner

*Primary Examiner* — Kathleen Y Dulaney
(74) *Attorney, Agent, or Firm* — Edwards Wildman Palmer LLP

(57) ABSTRACT

The individual identification data register of the present invention includes: a storage device storing projection matrix data showing a projection matrix generated from plural image data showing plural persons' faces and individual identification data showing a component value indicating a registered person's facial feature; and an arithmetic processing device executing the processing of calculating a component value showing the person's facial feature based on image data showing the person's face obtained by a camera and the projection matrix data stored in the storage device, determining whether or not individual identification data showing a component value generating an error smaller than a predetermined threshold value when compared with the calculated component value is stored in the storage device, and storing component value data showing the calculated component value into the storage device, as individual identification data, when determining that the individual identification data is not stored in the storage device.

8 Claims, 15 Drawing Sheets

INDIVIDUAL IDENTIFICATION DATA REGISTER FOR STORING COMPONENTS AND PROJECTION MATRICES

CROSS-REFERENCE TO RELATED APPLICATIONS

This application claims benefit of priority based on Japanese Patent Application No. 2007-151961 filed on Jun. 7, 2007. The contents of this application are incorporated herein by reference in their entirety.

BACKGROUND OF THE INVENTION

1. Field of the Invention

The present invention relates to an individual identification data register.

2. Discussion of the Background

Recently, the face recognition technology capable of identifying the face of an individual has been developed, and is on its way to being used in variety of instances including entrance/exit control and suspicious person monitoring.

In a typical face recognition device, data showing a facial image of each individual person is previously registered as data unique to that person (individual identification data).

In the identification stage, a newly input image is compared with the registered image, to determine whether or not the person of the input image is any of the persons whose facial image has been previously stored (cf. JP-A 2006-236244).

The contents of JP-A 2006-236244 are incorporated herein by reference in their entirety.

SUMMARY OF THE INVENTION

The foregoing conventional face recognition device solely serves to compare input data with registered individual identification data. Namely, the conventional face recognition device only determines whether or not the person of an input image and a previously registered person are the same person; the device does not register data on the new person when determining that those are not the same person.

However, provision of a device capable of registering new individual identification data simultaneously with performing recognition makes it possible to produce a new value, e.g. in providing a membership-system introduced service, not only identification of a member or a non-member but registration of a non-member, and the like, are conducted.

The present invention was made in view of the foregoing problem, and has an object to provide an individual identification data register capable of registering individual identification data simultaneously with performing face recognition, thus having a new utility value in face recognition.

In order to solve the foregoing problem, the present invention provides an individual identification data register as follows.

(1) An individual identification data register comprising: a camera for capturing an image of the face of a person; a storage device; and an arithmetic processing device, wherein the storage device stores projection matrix data showing a projection matrix generated from a plurality of image data obtained by capturing images of the faces of a plurality of persons, and individual identification data showing a component value that indicates a facial feature of a person registered, and the arithmetic processing unit executes the processing of (A) calculating a component value showing a facial feature of the person, based on image data showing the face of the person obtained by the camera and on the projection matrix data stored in the storage device, (B) determining whether or not individual identification data showing a component value generating an error smaller than a predetermined threshold value when compared with the component value calculated in the processing (A) is stored in the storage device, and (C) storing component value data showing the component value calculated in the processing (A), as individual identification data, into the storage device, when determining in the processing (B) that the individual identification data is not stored in the storage device.

According to the invention of (1), a component value showing facial features of a person is calculated based on image data showing the face of the person obtained by the camera and on projection matrix data showing a projection matrix. The projection matrix is generated from image data showing faces of a plurality of persons, and previously stored in the storage device.

It is then determined whether or not individual identification data, which shows a component value generating an error smaller than a predetermined threshold value when compared with the calculated component value, is stored in the storage device. The individual identification data is stored in the storage device as data showing a component value, which indicates facial features of the registered person.

When it is determined that individual identification data, which shows a component value generating an error smaller than the predetermined threshold value when compared with the calculated component value, is not stored in the storage device, component value data showing the calculated component value is stored into the storage device, as individual identification data on a new person.

As just described, according to the invention of (1), when it is determined that the person being captured by the camera is not the previously registered person, individual identification data showing facial features of the person being captured is newly registered. Namely, according to the invention of (1), individual identification data can be registered simultaneously with performance of recognition.

In the conventional face recognition device, some processing (e.g. unlocking) is performed only when it is determined that the person being captured by the camera is one of the previously registered persons, and any special processing is not performed when it is determined that the person being captured by the camera is not the previously registered person.

As opposed to this, according to the invention of (1), when it is determined that the person being captured by the camera is not the previously registered person, individual identification data is newly registered.

The invention of (1) particularly produces an enormous effect by being applied to an instance as follows: when it is determined whether or not the person being captured by the camera is one of the previously registered persons, new registration of individual identification data on the person is desired to be conducted in the case where it is determined that the person is not any of the previously registered persons.

Examples of such an instance may include gaming facilities.

By adjunctively installing the individual identification data register of the invention of (1) in a gaming machine, it is possible to register individual identification data on a player having played a game in the gaming machine. The registered individual identification data can then be put to practical use for providing new service to the player.

Further, the present invention provides the following individual identification data register.

(2) The individual identification data register according to the above-mentioned (1), wherein the processing (B) is the processing of (B-1) determining a minimum value among respective errors, the respective errors being calculated by comparing the component value calculated in the processing (A) with the respective individual identification data stored in the storage device, (B-2) determining whether or not the minimum value determined in the processing (B-1) is equal to or more than a predetermined threshold value, and (B-3) determining that individual identification data showing a component value generating an error smaller than the predetermined threshold value when compared with the component value calculated in the processing (A) is not stored in the storage device, when determining in the processing (B-2) that the minimum value is equal to or more than the predetermined threshold value.

According to the invention of (2), the component value showing facial features of the person is calculated based on image data showing the face of the person obtained by the camera and projection matrix data showing a projection matrix. The projection matrix is generated from image data showing faces of a plurality of persons, and previously stored in the storage device. The calculated component value is compared with each of the individual identification data stored in the storage device so as to calculate respective errors, and a minimum value among the respective errors is determined. It is then determined whether or not the determined minimum value is equal to or more than the predetermined threshold value.

When it is determined that the minimum value is equal to or more than the predetermined threshold value, component value data showing the calculated component value is stored as individual identification data on a new person into the storage device.

As just described, according to the invention of (2), when it is determined that the person being captured by the camera is not any of the previously registered persons, individual identification data showing facial features of the person being captured is newly registered. Namely, according to the invention of (2), individual identification data can be registered simultaneously with performance of recognition.

In the conventional face recognition device, some processing (e.g. unlocking) is performed only when it is determined that the person being captured by the camera is one of the previously registered persons, and special processing is not performed when it is determined that the person being captured by the camera is not any of the previously registered persons.

As opposed to this, according to the invention of (2), when it is determined that the person being captured by the camera is not any of the previously registered persons, individual identification data is newly registered.

Further, the present invention provides the following individual identification data register.

(3) The individual identification data register according to the above-mentioned (1), wherein the processing (A) is the processing of calculating a plurality of component values showing facial features of the person, based on the projection matrix data and on a plurality of image data showing the face of the person which have been obtained by capturing images using the camera at predetermined time intervals.

According to the invention of (3), a plurality of component values are calculated based on a plurality of image data.

Therefore, since comparison is performed based on data showing the plurality of component values, it is possible to realize comparison with high accuracy.

Further, the present invention provides the following individual identification data register.

(4) The individual identification data register according to the above-mentioned (1), wherein the arithmetic processing device further executes the processing of (D) generating an individual-identification projection matrix based on the image data showing the face of the person obtained by the camera, when determining in the processing (B) that individual identification data showing a component value generating an error smaller than the predetermined threshold value when compared with the component value calculated in the processing (A) is not stored in the storage device, and the processing (C) is the processing of storing component value data showing the component value calculated in the processing (A) and individual-identification projection matrix data showing the individual-identification projection matrix generated in the processing (D), as the individual identification data, into the storage device, when determining in the processing (B) that individual identification data showing a component value generating an error smaller than the predetermined threshold value when compared with the component value calculated in the processing (A) is not stored in the storage device.

According to the invention of (4), when it is determined that individual identification data showing a component value generating an error smaller than the predetermined threshold value when compared with the calculated component value is not stored in the storage device, an individual-identification projection matrix is generated based on the image data showing the face of the person obtained by the camera. Then, individual-identification projection matrix data showing the individual-identification projection matrix is registered along with the component value data, as individual identification data.

The individual-identification projection matrix shows facial features of a person as does the component value, but is different from the component value. Therefore, the registered individual identification data precisely shows the facial features of the person since the registered individual identification data includes two types of information, which are the component value and the individual-identification projection matrix.

Further, the present invention provides the following individual identification data register.

(5) The individual identification data register according to the above-mentioned (1), wherein the arithmetic processing device repeatedly executes the processing (A) to (C) as one cycle, and further executes the processing of (E) determining at predetermined time intervals whether or not persons having been captured by the camera from a certain time point to the current time point are the same person, and the processing (C) is the processing of (C-1) storing component value data showing a component value calculated lastly out of the component values calculated in the processing (A), as individual identification data, into the storage device, when first determining in the processing (B) that individual identification data showing a component value generating an error smaller than the predetermined threshold value when compared with the component value calculated in the processing (A) is not stored in the storage device after having determined in the processing (E) that the persons being captured by the camera are not the same person, and (C-2) storing component value data showing a component value calculated lastly out of the component values calculated in the processing (A) into the storage device, as new individual identification data, in place of individual identification data stored lastly out of the individual identification data stored in the storage device, when determining in the processing (B) that individual identification data showing a component value generating an error smaller than the predetermined threshold value when compared with the component value calculated in the processing (A) is not stored in the storage device in the state in which it is not determined that the persons being captured by the camera are not the same person after the processing (C-1).

According to the invention of (5), component value data showing a component value calculated lastly out of the calculated component values is stored as individual identification data into the storage device, when it is first determined that individual identification data showing a component value generating an error smaller than the predetermined threshold value when compared with the calculated component value is not stored in the storage device, after it has been determined that the persons being captured by the camera are not the same person, namely after capturing of some person has been started.

As opposed to this, component value data showing a component value calculated lastly out of the calculated component values is stored as new individual identification data into the storage device, in place of individual identification data stored lastly out of the individual identification data stored in the storage device, when it is determined that individual identification data showing a component value generating an error smaller than the predetermined threshold value when compared with the calculated component value is not stored in the storage device in the state in which it is not determined that the persons being captured by the camera are not the same person after individual identification data on some person has been registered.

As just described, according to the invention of (5), after the individual identification data on some person has been once registered, when it is determined that individual identification data showing a component value generating an error smaller than the predetermined threshold value when compared with the calculated component value is not stored in the storage device even though it is determined that the person being captured by the camera remains unchanged, new individual identification data is overwrite-saved.

It is therefore possible to update the individual identification data on the person to data more precisely showing facial features of the person.

Further, the present invention provides the following individual identification data register.

(6) The individual identification data register according to the above-mentioned (4),
wherein
the arithmetic processing device repeatedly executes the processing (A) to (D) as one cycle, and further executes processing of (E) determining at predetermined time intervals whether or not persons being captured by the camera from a certain time point to the current time point are the same person, and the processing (C) is the processing of (C-1) storing component value data showing a component value calculated lastly out of the component values calculated in the processing (A) and individual-identification projection matrix data showing an individual-identification projection matrix generated lastly out of the individual-identification projection matrices generated in processing (E), as individual identification data, into the storage device, when first determining in the processing (B) that individual identification data showing a component value generating an error smaller than the predetermined threshold value when compared with the component value calculated in the processing (A) is not stored in the storage device after having determined in the processing (E) that the persons being captured by the camera are not the same person, and (C-2) storing component value data showing a component value calculated lastly out of the component values calculated in the processing (A) and individual-identification projection matrix data showing an individual-identification projection matrix generated lastly out of the individual-identification projection matrices generated in the processing (E) into the storage device, as new individual identification data, in place of individual identification data stored lastly out of the individual identification data stored in the storage device, when determining in the processing (B) that individual identification data showing a component value generating an error smaller than the predetermined threshold value when compared with the component value calculated in the processing (A) is not stored in the storage device in the state in which it is not determined that the persons being captured by the camera are not the same person after the processing (C-1).

According to the present invention of (6), component value data showing a component value calculated lastly out of the calculated component values and individual-identification projection matrix data showing an individual-identification projection matrix generated lastly out of the generated individual-identification projection matrices are stored as individual identification data into the storage device, when it is first determined that individual identification data showing a component value generating an error smaller than the predetermined threshold value when compared with the calculated component value is not stored in the storage device after it has been determined that the persons being captured by the camera are not the same person.

As opposed to this, component value data showing a component value calculated lastly out of the calculated component values and individual-identification projection matrix data showing an individual-identification projection matrix generated lastly out of the generated individual-identification projection matrices are stored as new individual identification data into the storage device, in place of individual identification data stored lastly out of the individual identification data stored in the storage device, when it is determined that individual identification data showing a component value generating an error smaller than the predetermined threshold value when compared with the calculated component value is not stored in the storage device in the state in which it is not determined that the persons being captured by the camera are not the same person after individual identification data on some person has been registered.

As just described, according to the invention of (6), after the individual identification data on some person has been registered, when it is again determined that individual identification data showing a component value generating an error smaller than the predetermined threshold value when compared with the calculated component value is not stored in the storage device even though it is determined that the person being captured by the camera remains unchanged, new individual identification data is overwrite-saved.

It is therefore possible to update the individual identification data on the person to data more precisely showing facial features of the person.

Further, the present invention provides the following individual identification data register.

(7) The individual identification data register according to the above-mentioned (5), wherein the arithmetic processing device further executes processing of (F) determining at predetermined time intervals whether or not the image data obtained by the camera includes information showing the face of a person, and the processing (E) includes the processing of determining that persons being captured by the camera from the time point of the processing (C-1) to the current time point are the same person, when not determining in the processing (F) that the image data does not include the information showing the face of the person, during the time between the time point of the processing (C-1) and the current time point.

According to the invention of (7), it is determined that persons being captured by the camera from the time point of the processing (C-1) (from the time point when individual identification data on some person has been once registered) to the current time point are the same person, when it is determined that all of the image data obtained by the camera include information showing the face of the person during that time period. The possibility is high that the same person continuously exists within the capture range during the time when it is not determined that the image data does not include information on the face of the person. Accordingly, based on this determination, the above processing relating to overwrite-saving can be performed.

Further, present invention provides the following individual identification data register.

(8) The individual identification data register according to the above-mentioned (5), wherein the arithmetic processing device further executes the processing of (G) measuring a weight applied to a seat for a person captured by the camera to sit, and the processing (E) includes the processing of determining whether or not persons being captured by the camera from a certain time point to the current time point are the same person, based on the weight measured in the processing (G).

According to the invention of (8), a weight applied to a seat for a person captured by the camera to sit is measured, and based on the measured weight, it is determined whether or not persons being captured by the camera from the time point when individual identification data on some person has been once registered to the current time point are the same person. In a case where the weight applied to the seat remains unchanged, or in some other case, both possibilities that the person has left the seat and that another person has sit in the seat are low. Therefore, in such a case, it can be determined that the person being captured remains unchanged, so as to perform the above processing relating to overwrite-saving.

Further, the present invention provides the following individual identification data register.

(9) The individual identification data register according to the above-mentioned (5), wherein the individual identification data register is adjunctively installed in a gaming machine, and the processing (E) includes the processing of determining that persons being captured by the camera from a certain time point to the current time point are the same person, when a special game being a game relatively advantageous for the player is executed as a game to be executed in the gaming machine.

According to the invention of (9), the individual identification data register is adjunctively installed in a gaming machine. It is determined that persons being captured by the camera from the time point when a specific game has been started to the current time point are the same person, when the special game being a game relatively advantageous for a player is executed as a game to be executed in the gaming machine. During execution of the special game, the possibility that the person leaves the place is low. Therefore, in such a case, it can be determined that the person being captured remains unchanged, so as to perform the above processing relating to overwrite-saving.

According to the present invention, the individual identification data register is provided which is capable of registering individual identification data simultaneously with performing recognition, thus having a new utility value in face recognition.

DESCRIPTION OF THE EMBODIMENTS

Figure 1:
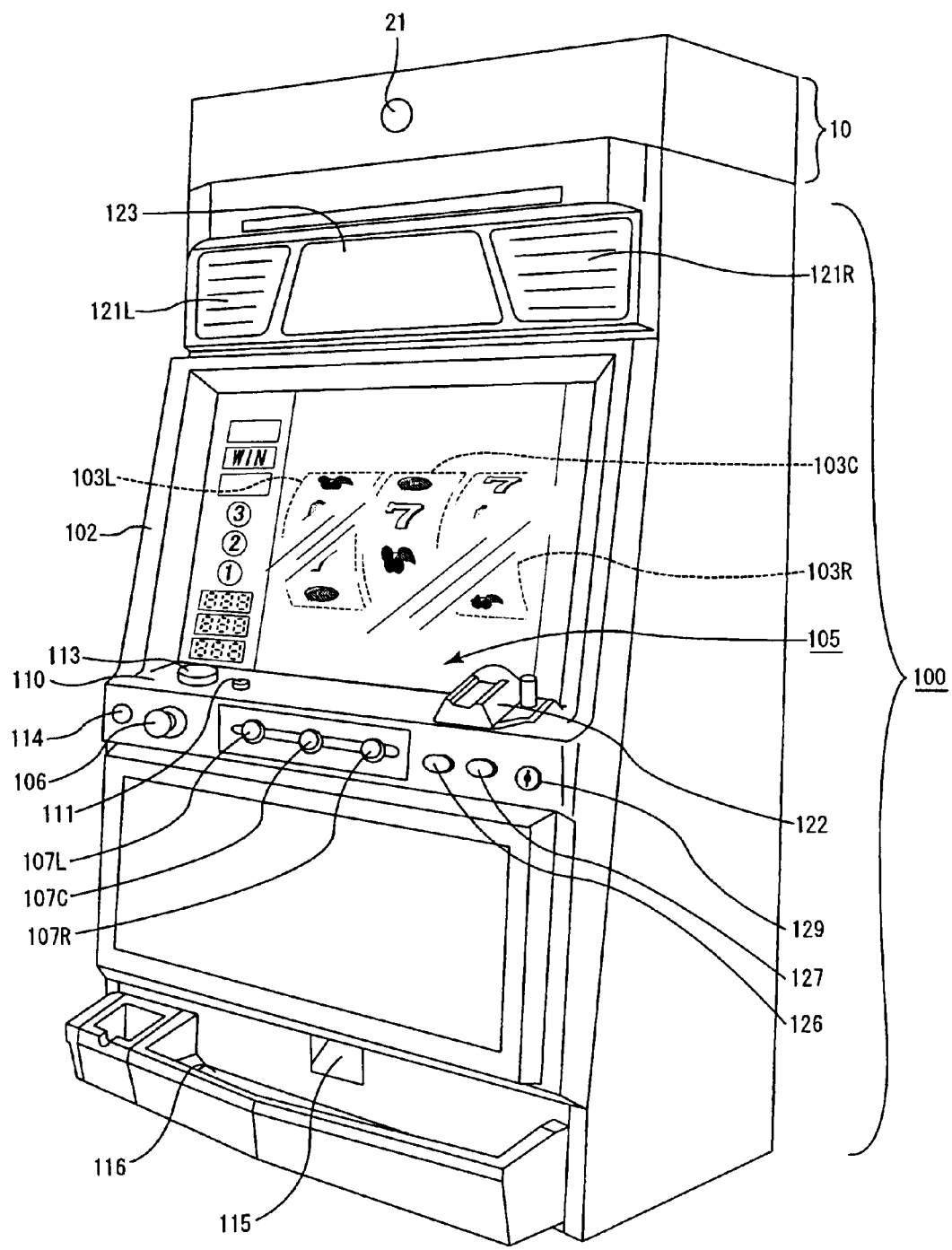
FIG. 1 is a perspective view schematically showing an individual identification data register and a pachislo gaming machine according to one embodiment of the present invention.

FIG. 1 is a perspective view schematically showing individual identification data register and a pachislo gaming machine according to one embodiment of the present invention.

As shown in FIG. 1, an individual identification data register 10 according to the present embodiment is installed on the top of a pachislo gaming machine 100. The individual identification data register 10 includes a CCD camera 21. The CCD camera 21 serves to capture images of the face of a player playing a game on the pachislo gaming machine 100. The CCD camera 21 corresponds to the camera in the present invention.

Next, the pachislo gaming machine 100 according to the present embodiment is described.

The pachislo gaming machine 100 corresponds to the gaming machine of the present invention. The gaming machine of the present invention is not restricted to this example, and examples thereof may include a pachinko gaming machine and a slot machine. Further, the pachislo gaming machine 100 is a gaming machine capable of conducting a game using game media such as a card storing information on a game value that has been offered or will be offered, in addition to coins, medals, tokens, or the like; however, hereinafter, a case of using medals will be described.

As shown in FIG. 1, a liquid crystal display 105 is installed on the front surface of the cabinet 102 forming the whole of the pachislo gaming machine 100. This liquid crystal display 105 has a transparent liquid crystal panel 134 (not shown). This transparent liquid crystal panel 134 is capable of switching part or the whole thereof to a transparent/non-transparent state, and also capable of displaying a two-dimensional image, a stereoscopic image, and the like.

Further, three rotation reels 103L, 103C and 103R are provided on the rear surface side of the liquid crystal display 105. The three rotation reels 103L, 103C and 103R respectively display identification information such as a plurality of symbols on the peripheral surfaces thereof, and are rotatably provided in a horizontal row.

A base portion 110 having a horizontal surface is formed below the liquid crystal display 105. A medal insertion slot 122 is provided on the right side of the base portion 110. A 1-BET switch 111 and a maximum BET switch 113 are provided on the left side of the base portion 110.

On the left side of the front surface portion of the base portion 110 is provided an accumulated medal settling switch 114 that switches credit/payout of medals, which have been acquired by the player in a game, by a pushing operation.

When "Payout" is selected by switching the accumulated medal settling switch 114, medals are paid out from a medal payout exit 115 on the lower portion of the front surface, and the paid-out medals are accumulated in a medal receiving portion 116. On the other hand, when "Credit" is selected, the number of medals is stored as credits into a memory (e.g. a later-described RAM 143, etc.) provided in the pachislo gaming machine 100.

A start lever 106 for rotating the rotation reels 103L, 103C and 103R by an operation of the player is installed to be rotatable in a predetermined angle range on the right side of the accumulated medal settling switch 114. Three stop buttons 107L, 107C and 107R for stopping the rotation of the respective three rotation reels 103L, 103C and 103R are provided at the center of the front surface portion of the base portion 110.

A determination button 126 and a cancel button 127 are provided on the right side of the front surface portion of the base portion 110. By operation of the determination button 126 and the cancel button 127, switching of the display screen of the liquid crystal display 105, input of a command, and the like, can be performed.

Further, a door opening-closing/shoot-stop canceling device 129 is further provided on the right side of the front surface portion of the base portion 110. Using a predetermined key, this door opening-closing/shoot-stop canceling device 129 is rotated to the right to open/close the front door, and rotated to the left to cancel stopping of shooting.

Speakers 121L and 121R are provided on the respective right and left of the upper portion of the cabinet 102, and a payout table panel 123 showing winning symbol-combinations and the numbers of payouts of medals is provided between the two speakers 121L and 121R.

Figure 2:
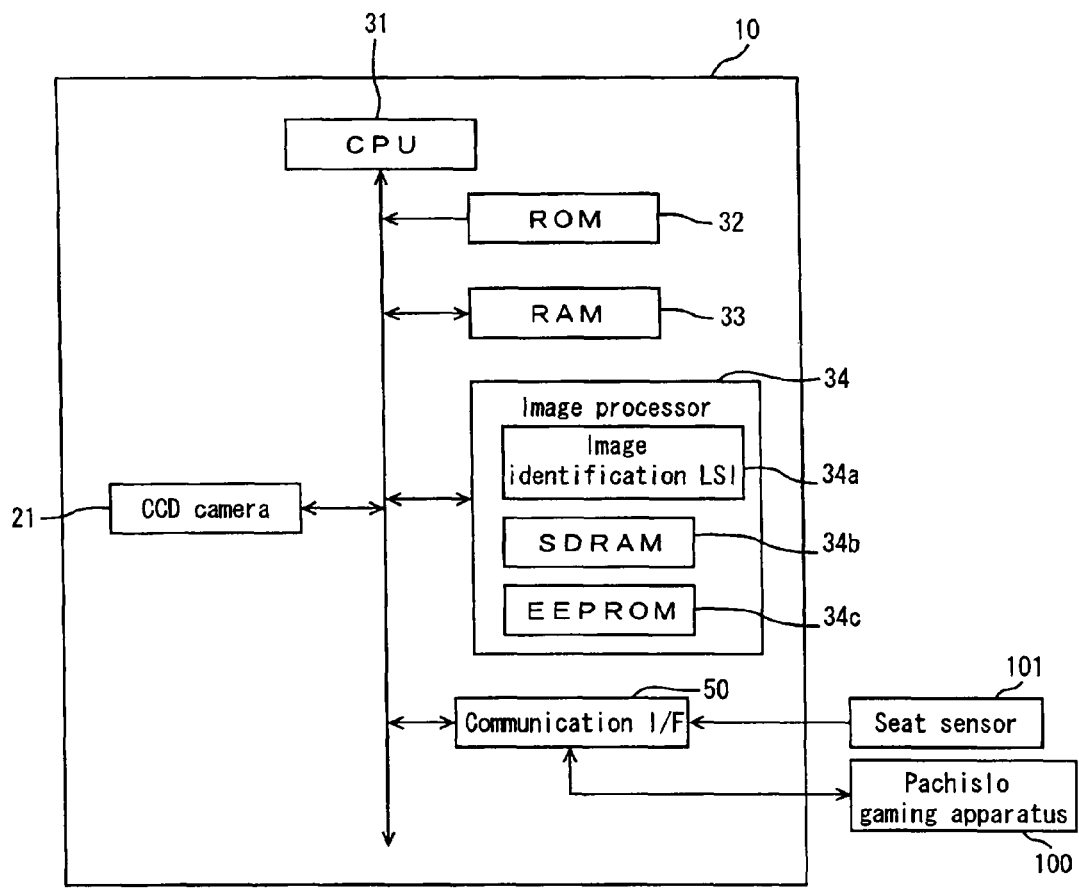
FIG. 2 is a block diagram showing an internal configuration of the individual identification data register shown in FIG. 1.

FIG. 2 is a block diagram showing an internal configuration of the individual identification data register according to one embodiment of the present invention.

The individual identification data register 10 includes a CPU 31, a ROM 32 and a RAM 33.

The ROM 32 is a nonvolatile memory, and stores a program to be executed by the CPU 31, data to be used by the CPU 31 in conducting processing, and the like.

The RAM 33 is a volatile memory, and temporarily stores data corresponding to the processing results by the CPU 31 or the like. Particularly in the present embodiment, the RAM 33 stores individual identification data. The individual identification data is data showing features of a facial image of each individual person, and data unique to the person. The individual identification data is described in detail later.

The CPU 31 is connected with the CCD camera 21 and an image processor 34.

The image processor 34 has an image identification LSI 34a, an SDRAM 34b and an EEPROM 34c. Although not shown, the image identification LSI 34a includes: a module having a coprocessor that can process a plurality of data in parallel for a single command; a DRAM; and a DMA controller. The SDRAM 34b temporarily stores image data output from the CCD camera 21.

The EEPROM 34c stores projection matrix data. The projection matrix data is data showing a projection matrix, and the projection matrix is a matrix for use in an eigenface method which is famous in the field of face recognition.

The eigenface method is a method in which images (facial images) showing a plurality of persons collected as samples are regarded as vectors whose component are luminance values of pixels (vectors whose components are luminance values of pixels are hereinafter also referred to as "luminance value vectors"), and principal component analysis and independent component analysis are performed, to obtain a partial space showing the facial features of a person. This partial space is obtained based on facial images of a variety of persons, and describes the facial features of a person.

The projection matrix is a matrix for projecting the luminance value vector to the partial space. It is to be noted that the eigenface method is a conventionally known technique, and is described, for example, in "Principal Component Analysis in Pattern Recognition—From the Viewpoint of Facial Image Recognition—" in Statistical Mathematics Vol. 49 (2001) No. 1, p23-42, and the like. Hence the descriptions of the eigenface method are omitted here.

The RAM 33 and the EEPROM 34*c* configure the storage device in the present invention.

In the present invention, the projection matrix data and the individual identification data may be stored in the respective different RAM or ROM as in the present embodiment, or may be stored in a storage region separately provided in a single RAM or ROM.

Figure 5:
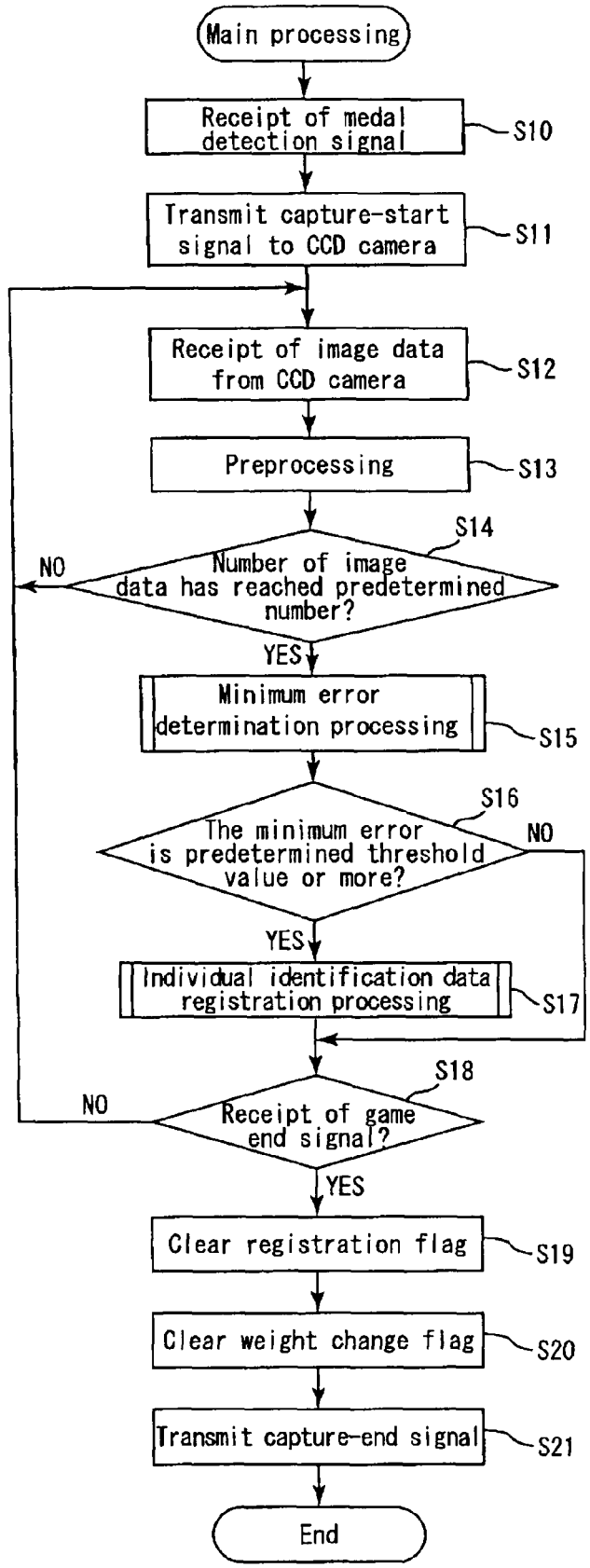
FIG. 5 is a flowchart showing main processing conducted in the individual identification data register.

The image processor 34 performs preprocessing on image data input by the CCD camera 21 (cf. step S13 in FIG. 5). Further, the image processor 34 performs processing relating to calculation of a component value. The component value is a vector obtained by projecting the luminance value vector showing input image data to the partial space, by means of the projection matrix. Namely, the component value shows facial features of an individual.

The CPU 31 is further connected with a communication I/F 50. The communication I/F 50 is connected with the pachislo gaming machine 100 and a seat sensor 101.

The seat sensor 101 is included in a seat for a player to sit. In the present embodiment, the seat sensor 101 is configured so as to detect a change in weight applied to the seat when the change occurs, and to transmit a weight change detection signal through the communication I/F 50.

Figure 3:
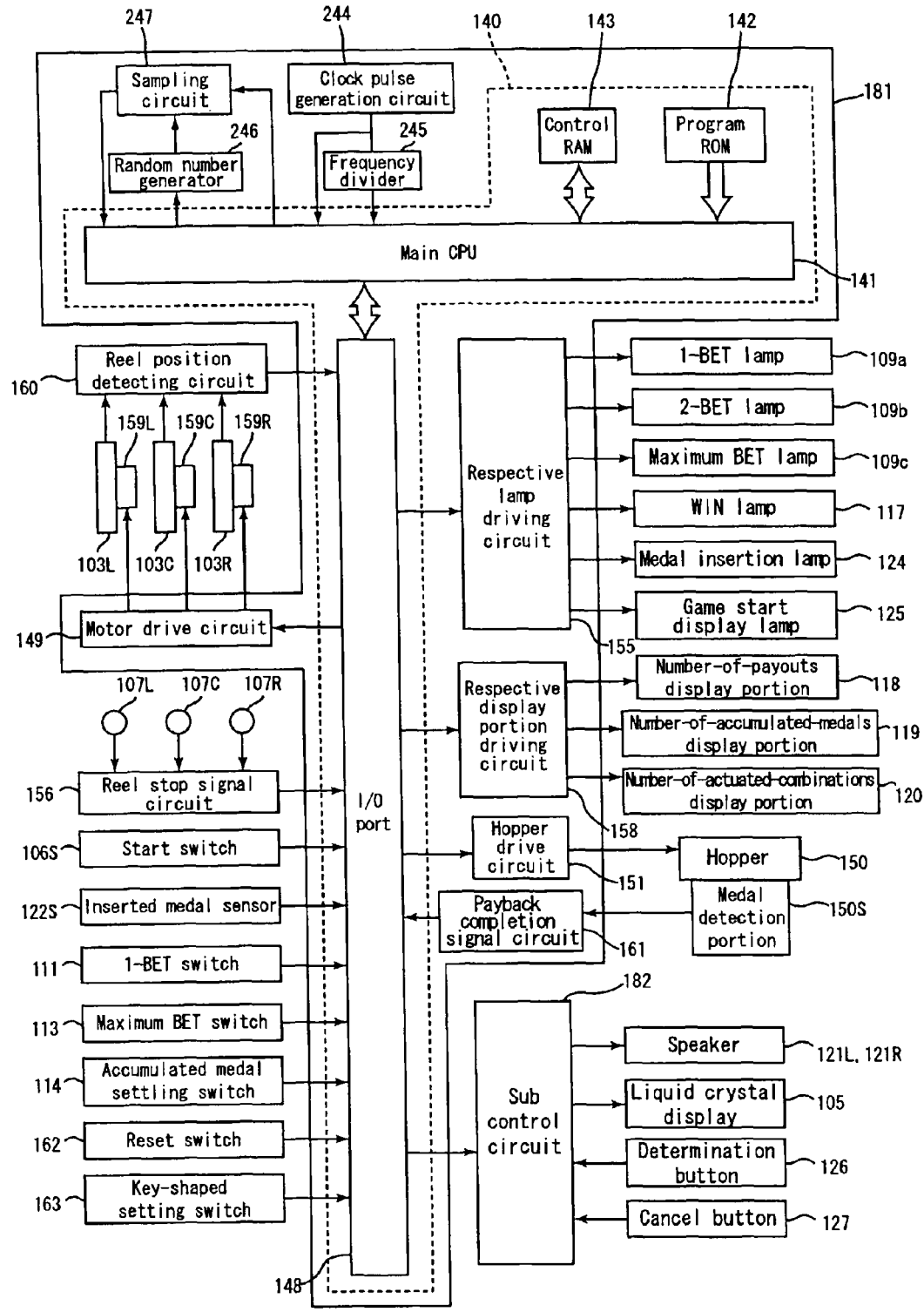
FIG. 3 is a block diagram showing an internal configuration of the pachislo gaming machine shown in FIG. 1.

FIG. 3 is a block diagram showing an internal configuration of the pachislo gaming machine shown in FIG. 1.

A main control circuit 181 is mainly configured by a microcomputer 140 arranged on a circuit board. The microcomputer 140 includes a main CPU 141 for gaming machine control which performs a control operation according to a previously set program, a ROM 142 and a RAM 143. The main CPU 141 for gaming machine control is connected with a clock pulse generation circuit 244 that sets a reference clock pulse and a frequency divider 245, and a random number generator 246 that generates a random number to be sampled and a sampling circuit 247. In addition, as a way for random number sampling, it may be configured that the random number sampling is executed on an operation program of the main CPU 141 for gaming machine control.

A variety of control commands to be transmitted to a sub control circuit 182, and the like, are stored in the ROM 142. As the commands, for example, a command regarding display-control to the liquid crystal display 105 and some other commands are stored.

Examples of the command regarding display-control to the liquid crystal display 105 may include an effect start command and an end effect command.

The effect start command is a command for displaying an effect image to the liquid crystal display 105 at the start of rotation of the three rotation reels 103. The end effect command is a command for displaying an effect image to the liquid crystal display 105 at the stop of all of the three rotation reels 103. Further, a command regarding setting or cancel of RB, BB is also stored in the ROM 142, and by this command, setting or cancel of the RB or BB is notified to the sub control circuit 182. It should be noted that in place of the command regarding setting or cancel of the RB and BB, data showing that the RB or BB is in execution may be included in a variety of commands regarding display-control to the liquid crystal display 105.

The variety of commands as described above are invoked from the ROM 142 by the main CPU 141 for gaming machine control when a predetermined condition is established, to be set in the RAM 143. The command set in the RAM 143 is then supplied to the sub control circuit 182 at a predetermined timing. The sub control circuit 182 executes a variety of processing based on the supplied command.

It is to be noted that communication is performed in one direction from the main control circuit 181 to the sub control circuit 182 without input of a command or the like by the sub control circuit 182 to the main control circuit 181. Further, a symbol table is stored in the ROM 142 so that rotational positions of the rotation reels 103L, 103C and 103R are associated with the symbols drawn on the peripheral surfaces of the rotation reels. Moreover, The ROM 142 stores: a winning symbol-combination table in which winning combinations of symbols, the numbers of medal-payouts for winnings, and winning determination codes representing the winnings are corresponded to one another; a lottery probability table needed for performing a lottery to determine an internal winning combination; and the like.

Other than the foregoing commands, the RAM 143 stores, for example, a variable, a flag and the like according to the game progress, such as the number of credits corresponding to the number of medals.

Examples of main peripheral devices (actuators), whose operations are controlled by control signals from the microcomputer 140, may include: a variety of lamps (1-BET lamp 109*a*, 2-BET lamp 109*b*, maximum BET lamp 109*c*, WIN lamp 117, game medal insertion lamp 124, game start display lamp 125); a variety of display portions (number-of-payouts display portion 118, number-of-accumulated-medals display portion 119, number-of-actuated combinations display portion 120); a hopper (including a driving portion for payout) 150 that houses medals and pays out medals in predetermined number according to a command from a hopper driving circuit 151; and stepping motors 159L, 159C and 159R which rotationally drive the rotation reels 103L, 103C and 103R.

Moreover, an output portion of the main CPU 141 for gaming machine control is connected through an I/O port 148 with a motor drive circuit 149 that drive-controls the stepping motors 159L, 159C and 159R, a hopper drive circuit 151 that drive-controls the hopper 150, a lamp driving circuit 155 that drive-controls the lamp driving circuit 155, and a display portion driving circuit 158 that drive-controls a variety of display portions. Upon receipt of a control signal such as a driving command output from the main CPU 141 for gaming machine control, each of those drive circuits controls an operation of each actuator.

Further, as main input-signal generators that generate an input signal necessary for the microcomputer 140 to generate a control command, there are the start switch 106S, the 1-BET switch 111, the maximum BET switch 113, the accumulated medal settling switch 114, an inserted medal sensor 122S, a reset switch 162, a key-shaped setting switch 163, a reel stop signal circuit 156, a reel position detection circuit 160, and a payout completion signal circuit 161. These are also connected to the main CPU 141 for gaming machine control through the I/O port 148.

The start switch 106S detects an operation of the start lever 106. The inserted medal sensor 122S detects a medal inserted into the medal insertion slot 122. The reel stop signal circuit 156 generates a stop signal according to an operation of each of the stop buttons 107L, 107C and 107R. By these operations, the determination button 126 and the cancel button 127 can make switching of the display screen of the liquid crystal display 105, input of a command, and the like.

Upon receipt of a pulse signal from a reel rotation sensor, the reel position detection circuit 160 transmits signals for detecting the positions of the rotation reels 103L, 103C and 103R to the main CPU 141 for gaming machine control.

When a counted value (the number of medals paid out from the hopper 150) of the medal detection portion 150S has reached a specified number of medals, the payout completion signal circuit 161 generates a medal payout completion signal. Upon receipt of this medal payout completion signal, the main CPU 141 for gaming machine control stops driving of the hopper 150 through the hopper drive circuit 151, to complete payout of medals. This medal detection portion 150S has a medal sensor including a physical sensor for detecting medals paid out from the hopper 150, or the like, and using this medal sensor, the number of payouts of medals can be counted.

In a circuit shown in FIG. 3, the random number generator 246 generates random numbers belonging to a certain numeric value range, and the sampling circuit 247 samples one random number at an appropriate timing after operation of the start lever 106. Based on the random number sampled in this manner and the lottery probability table stored in the ROM 142, an internal winning combination is determined. After the internal winning combination has been determined, a random number is sampled again to select a "stop control table".

After the start of rotation of the rotation reels 103L, 103C and 103R, the number of drive pulses supplied respectively to the stepping motors 159L, 159C and 159R are counted, and the counted values are written in a predetermined area of the RAM 143. Reset pulses are obtained from the rotation reels 103L, 103C and 103R in each rotation, and these pulses are input into the main CPU 141 for gaming machine control through the reel position detection circuit 160. The reset pulses as just described clear the counted value of the drive pulse counted in the RAM 143 to make it "0". Thereby, the counted values corresponding to the rotational positions of the respective reels 103L, 103C and 103R within the range of one rotation are stored into the RAM 143.

In order to have the rotational positions of the rotation reels 103L, 103C and 103R as described above to correspond to the symbols drawn on the peripheral surfaces of the reels, the symbol table is stored in the ROM 142. In this symbol table, code numbers sequentially offered at each certain rotational pitch of the rotation reels 103L, 103C and 103R, with the rotational position at which the foregoing reset pulse is generated as a reference, are respectively associated with symbol codes showing symbols provided for the respective code numbers.

Moreover, the winning symbol-combination table is stored in the ROM 142. In this winning symbol-combination table, winning combinations of symbols, the numbers of medal-payouts for winnings, and winning determination codes representing the winnings are associated with each other. The above winning symbol-combination table is referenced when the left reel 103L, the central reel 103C and the right reel 103R are stop-controlled and when winning is checked after stopping of all of the reels.

When the internal combination is won by lottery processing (probability lottery processing) based on the random number sampling, the main CPU 141 for gaming machine control transmits a signal for stop-controlling the rotation reels 103L, 103C and 103R, based on operation signals transmitted from the reel stop signal circuit 156 at the timing of the player operating the stop buttons 107L, 107C and 107R and on the selected "stop control table".

The main CPU 141 for gaming machine control supplies a payout command signal to the hopper drive circuit 151 so as to pay out medals in a predetermined number from the hopper 150, when "Payout" is selected by switching of the accumulated medal settling switch 114 in the case that a stop mode showing establishment of the internally won combination is displayed. At this time, the medal detection portion 150S counts the number of medals paid out from the hopper 150, and when the counted value reaches a specified number, a medal payout completion signal is input into the main CPU 141 for gaming machine control. Thereby, the main CPU 141 for gaming machine control stops the drive of the hopper 150 through the hopper drive circuit 151, to end the "medal payout processing".

On the other hand, when "Credit" is selected by switching of the accumulated medal settling switch 114, the number of medals to be paid out is stored as the number of credits into the RAM 143.

The main control circuit 181 having the main CPU 141 for gaming machine control therein is connected with the sub control circuit 182.

The sub control circuit 182 performs display-control of the liquid crystal display 105 and output-control of a sound from the speakers 121L and 121R, based on a control command from the main control circuit 181.

Figure 4:
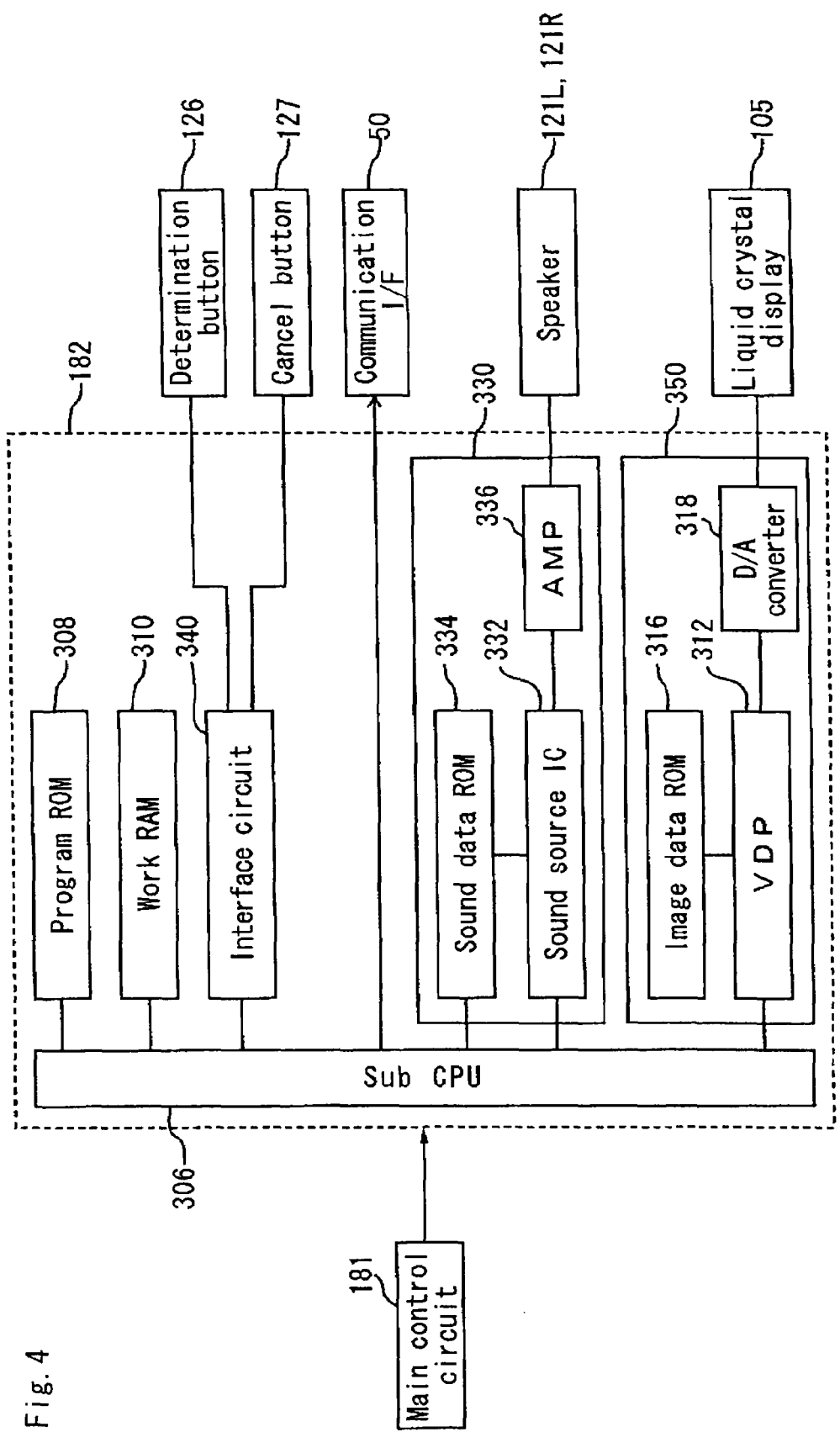
FIG. 4 is a block diagram showing an internal configuration of the sub control circuit shown in FIG. 3.

FIG. 4 is a block diagram showing a configuration of the sub control circuit shown in FIG. 3.

It is configured in the present embodiment such that a command is supplied from the main control circuit 181 to the sub control circuit 182, and a signal cannot be supplied from the sub control circuit 182 to the main control circuit 181. However, the configuration is not restricted to this, and it may be configured such that a signal can be transmitted from the sub control circuit 182 to the main control circuit 181.

The sub control circuit 182 has a sub CPU 306 for gaming machine control, a program ROM 308 and a work RAM 310. Further, the sub control circuit 182 is connected with the determination button 126 and the cancel button 127 through an interface circuit 340.

Further, the sub control circuit 182 has a display-control circuit 350 that performs display-control in the liquid crystal display 105, and a sound control circuit 330 that performs control regarding sound generated from the speakers 121.

The sub CPU 306 for gaming machine control has the function of executing a variety of processing according to programs stored in the program ROM 308, and controls the sub control circuit 182 according to a variety of commands supplied from the main CPU 141 for gaming machine control. Particularly, the sub CPU 306 for gaming machine control performs display-control of the display-control circuit 350.

In the program ROM 308, there is stored a program for the sub CPU 306 for gaming machine control to control game effects in the liquid crystal display 105, and in addition, a variety of tables such as a table for making a determination regarding the effects are stored.

Moreover, in the program ROM 308, there are stored a plurality of types of effect patterns corresponding to screen images displayed to the liquid crystal display 105, and a plurality of types of end effect patterns corresponding to screen images displayed to the liquid crystal display 105 at the stop of all of the reels 103.

It should be noted that, it is configured in the present embodiment such that the program ROM 308 is used as a storage medium for storing programs, tables, and the like. However, the configuration is not restricted thereto. The storage medium may be in a different mode so long as being readable by a computer having a CPU and the like, and may be recorded, for example, in a hard disc device or a storage medium such as a CD-ROM, a DVD-ROM or a ROM cartridge. Naturally, those stored in the program ROM 308 may be stored in the ROM 142. Further, these programs may not be previously recorded, and may be downloaded after turningon of power, and recorded in the work RAM 310 or the like. Moreover, each of the programs may be recorded in a different storage medium.

Further, in the present embodiment, the main control circuit 181 including the main CPU 141 for gaming machine control and the ROM 142 therein and the sub control circuit 182 including the sub CPU 306 for gaming machine control and the program ROM 308 therein are separately configured. However, the configuration is not restricted thereto. Only the main control circuit 181 including the main CPU 141 for gaming machine control and the ROM 142 therein may constitute the circuit; in this case, it may be configured such that programs stored in the foregoing program ROM 308 are stored into the ROM 142 and executed by the main CPU 141 for gaming machine control. Naturally, only the sub control circuit 182 including the sub CPU 306 for gaming machine control and the program ROM 308 therein may constitute the circuit; in this case, it may be configured such that programs stored in the foregoing ROM 142 are stored into the program ROM 308 and executed by the sub CPU 306 for gaming machine control.

The work RAM 310 has the function of storing a variety of flags and variable values, as a temporary storage region of the sub CPU 306 for gaming machine control. It is to be noted that, although the work RAM 310 is used as the temporary storage region of the sub CPU 306 for gaming machine control in the present embodiment, the temporary storage region is not restricted thereto and may be any storage medium so long as being readable and writable.

Moreover, the sound control circuit 330 is configured by a sound source IC 332 that performs control regarding sound, a sound data ROM 334 that stores a variety of sound data, an amplifier 336 (hereinafter referred to as "AMP") for amplifying a sound signal.

The sound source IC 332 is connected with the sub CPU 306 for gaming machine control, the sound data ROM 334 and the AMP 336. This sound source IC 332 controls sound that is generated from the speakers 121.

The sub CPU 306 for gaming machine control selects one sound data from a plurality of sound data stored in the sound data ROM 334, based on a command supplied from the main CPU 141 for gaming machine control. Thereafter, the sub CPU 306 for gaming machine control reads the selected sound data from the sound data ROM 334, and supplies the sound data to the sound source IC 332. The sound source IC 332 having received the sound data converts the sound data into a predetermined sound signal, and supplies the sound signal to the AMP 336. The AMP 336 amplifies the sound signal and generates sound from the speakers 121 (121L and 121R).

The display-control circuit 350 generates a screen image according to a game result determined by the main CPU 141 for gaming machine control or a command input from the respective buttons 126, 127, and controls display of the screen image to the liquid crystal display 105. The display-control circuit 350 is configured by a video data processor (hereinafter referred to as "VDP") 312, an image data ROM 316 that stores a variety of image data, and a D/A converter 318 that converts image data into an image signal.

The VDP 312 is connected with the sub CPU 306 for gaming machine control, the image data ROM 316 in which image data is stored, and the D/A converter 318 that converts image data into an image signal.

This VDP 312 includes a variety of circuits such as so-called a sprite circuit, a screen circuit and a pallet circuit, and is capable of performing a variety of processing for displaying a screen image to the liquid crystal display 105. Namely, the VDP 312 performs display-control on the liquid crystal display 105. Further, the VDP 312 is provided with a storage medium (e.g. video RAM) as a buffer for displaying a screen image to the transparent liquid crystal panel 134 of the liquid crystal display 105. By storing image data in a predetermined storage region of this storage medium, a screen image is displayed to the transparent liquid crystal panel 134 of the liquid crystal display 105 at a predetermined timing.

The image data ROM 316 stores, for example, a background image, a character image representing a character, and the like.

The VDP 312 extracts an effect image from the image data ROM 316 according to an image display command from the sub CPU 306 for gaming machine control.

From here on, processing performed in the individual identification data register 10 is described based on flowcharts shown in FIG. 5 to FIG. 10B.

The processing shown in FIG. 5 to FIG. 10B is executed by cooperation of the CPU 31 and the image processor 34. The CPU 31 and the image processor 34 correspond to the arithmetic processing device in the present invention.

It is to be noted that processing below out of processing shown in FIG. 5 to FIG. 7 correspond to processing below out of the processing in the present invention.

Figure 6:
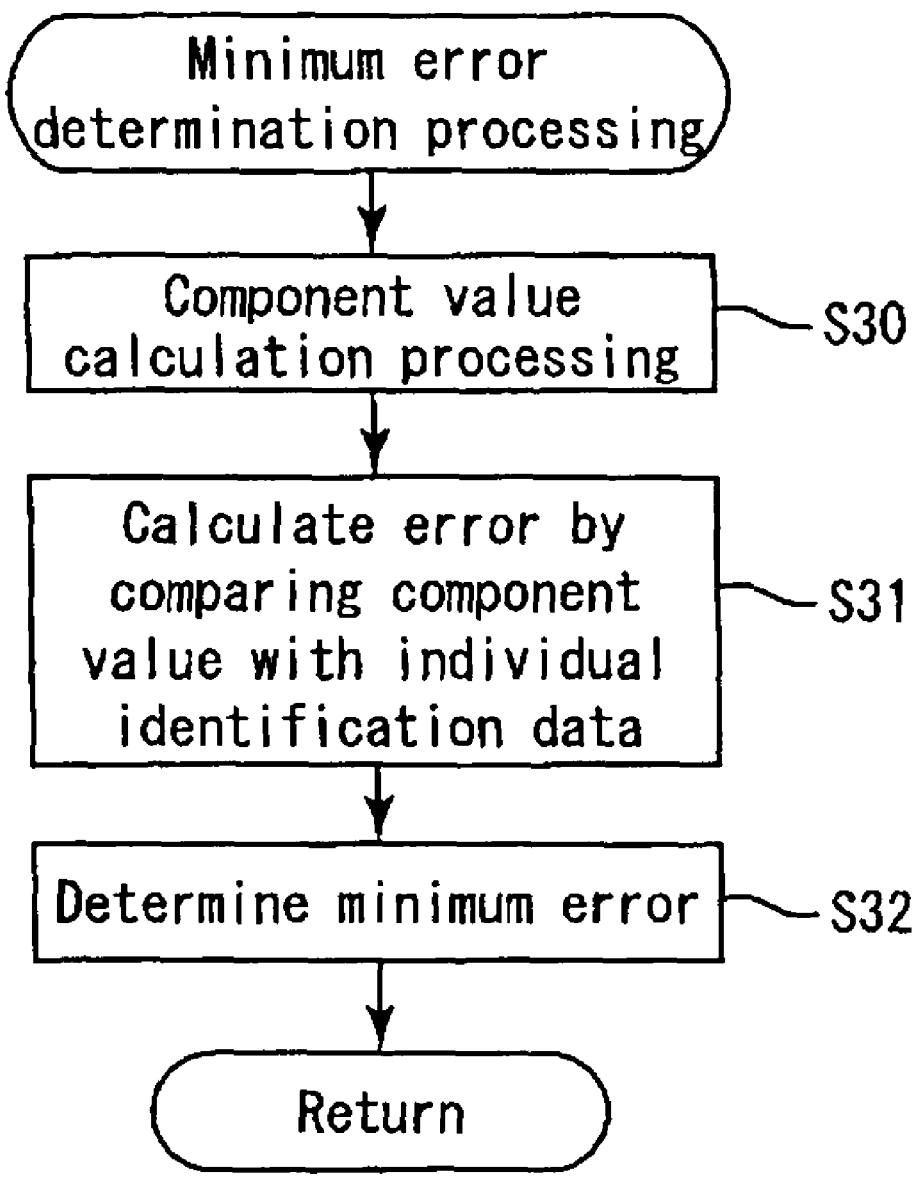
FIG. 6 is a flowchart showing a subroutine of minimum error determination processing.

(I) Processing of step S30 in FIG. 6 . . . Processing (A) in the present invention (II) Processing of step S31 to step S32 in FIG. 6 . . . Processing (B-1) in the present invention (III) Processing of step S16 in FIG. 5 . . . Processing (B-2) to (B-3) in the present invention (IV) Processing of step S17 in FIG. 5 . . . Processing (C) in the present invention (V) Processing of step S42 in FIG. 7 . . . Processing (C-1) in the present invention (VI) Processing of step S55 in FIG. 7 . . . Processing (C-2) in the present invention (VII) Processing of step S41 or step S54 in FIG. 7 . . . Processing (D) in the present invention (VIII) Processing of step S50 to step S53 in FIG. 7 . . . Processing (E) in the present invention In the following, each processing is described in detail.

FIG. 5 is a flowchart showing main processing performed in the individual identification data register.

First, the CPU 31 receives a medal detection signal from the main CPU 141 for gaming machine control of the pachislo gaming machine 100 (step S10). The medal detection signal is a signal transmitted by the main CPU 141 for gaming machine control when it is determined that a medal has been inserted (cf. step S300 and step S301 in FIG. 11A), and is transmitted to the CPU 31 through the communication I/F 50.

Next, the CPU 31 transmits a capture start signal to the CCD camera 21 (step S11). The capture start signal is a signal indicating start of capturing images. Upon receipt of this signal, the CCD camera 21 performs capturing of images at predetermined time intervals.

Next, the CPU 31 receives image data obtained by capturing images from the CCD camera 21 (step S12).

Next, the CPU 31 makes the image processor 34 perform preprocessing (step S13). Specifically, the image processor 34 performs the following processing.

(i) First, the image processor 34 reduces a resolution of received image data to 64×64 or lower, to perform histogram stretching and smoothing.

(ii) Next, the image processor 34 makes the luminance value equal to that of an average face in each one-eighth block in the image data after (i).

(iii) Next, the image processor 34 obtains a parameter of secondary affine transformation so as to maximize the correlation with the average face in the image data after (ii).

(iv) Next, the image processor 34 performs secondary affine transformation on the image data by using the parameter obtained in (iii), to cut out a 16×16 region.

(v) Next, the image processor 34 performs edge emphasis on the region cut out in (iv) by using a Laplacian filter and a Gaussian filter.

(vi) Next, the image processor 34 performs histogram stretching and smoothing on the luminance value lopsided in (v).

(vii) Next, the image processor 34 normalizes the luminance value in the region cut out in (iv) such that dispersion thereof is 1 and the average thereof is 0.

It is to be noted that the projection matrix in the present embodiment is calculated by performing the processing (i) to (vii) on data on facial images of a plurality of persons collected as samples, and thereafter executing principal component analysis.

Further, although the processing (i) to (vii) are performed as the preprocessing in the present embodiment, the preprocessing is not restricted to this example, and conventionally known processing can be adopted appropriately.

Next, the CPU 31 determines whether or not the number of the image data received in step S12 and subjected to the preprocessing in step S13 has reached a predetermined number (e.g. 5) (step S14). When determining that the number of the image data has not reached the predetermined number, the CPU 31 shifts the processing to step S12. On the other hand, when determining that the number of the image data has reached the predetermined number, the CPU 31 shifts the processing to step S15.

In step S15, the CPU 31 performs minimum error determination processing. Here, the minimum error determination processing is described using FIG. 6.

FIG. 6 is a flowchart showing a subroutine of the minimum error determination processing.

First, the CPU 31 makes the image processor 34 perform component value calculation processing (step S30). As described above, the component value is a vector obtained by projecting the luminance value vector showing input image data to the partial space by using the projection matrix, and shows facial features of an individual.

Namely, the image processor 34 calculates the component value by projecting the luminance value vector after the processing of step S13 to the partial space based on the projection matrix data stored in the EEPROM 34c. Since the component value is calculated from a predetermined number of image data (cf. step S14) in the present embodiment, the component value calculated in step S30 is comprised of a predetermined number of component values.

Next, the CPU 31 compares the component value data showing the component value calculated in step S30 with each of the individual identification data stored in the RAM 33, to calculate each error (step S31).

The errors calculated in step S31 are values showing differences in facial features of persons already registered in the individual identification data register and a person newly captured by the CCD camera 21.

Namely, as described later, when a minimum value (minimum error) out of the respective errors is a predetermined threshold value or more, this component value data is registered as individual identification data (cf. step S16 and step S17). As just described, since the data stored as the individual identification data in the individual identification data register is data showing the component value that shows facial features of the registered person, an error obtained by comparison between the component value data and the individual identification data shows a difference in facial features between the registered person and the captured person.

It is to be noted that in the present embodiment, a distance, which is typically used as a valuation formula for matching in the field of pattern recognition, is used as the error. Naturally, in the present invention, similarity may be used as the valuation formula for matching.

Next, the CPU 31 determines as the minimum error a minimum value out of the respective errors calculated in step S31 (step S32).

In the above, using FIG. 6, the minimum error determination processing in step S15 in FIG. 5 has been described.

Next, in step S16 in FIG. 5, the CPU 31 determines whether or not the minimum error determined in step S15 (step S32 in FIG. 6) is the predetermined threshold value or more. When determining that the minimum error is the predetermined threshold value or more, the CPU 31 performs individual identification data registration processing in step S17. On the other hand, when determining that the minimum error is smaller than the predetermined threshold value, the CPU 31 shifts the processing to step S18 without performing the processing of step S17.

As described above, in the present embodiment, the minimum error (minimum value of the distance) is obtained, and whether or not the minimum error is the predetermined threshold value or more is determined as processing relating to matching. Here, the determination that the minimum error is the predetermined threshold value or more denotes the determination that the person being captured by the CCD camera 21 differs from any of the persons already registered in the individual identification data register 10. Therefore, the individual identification data register 10 is configured to store individual identification data on the person as a new registrant, when determining that the minimum error is the predetermined threshold value or more.

Figure 7:
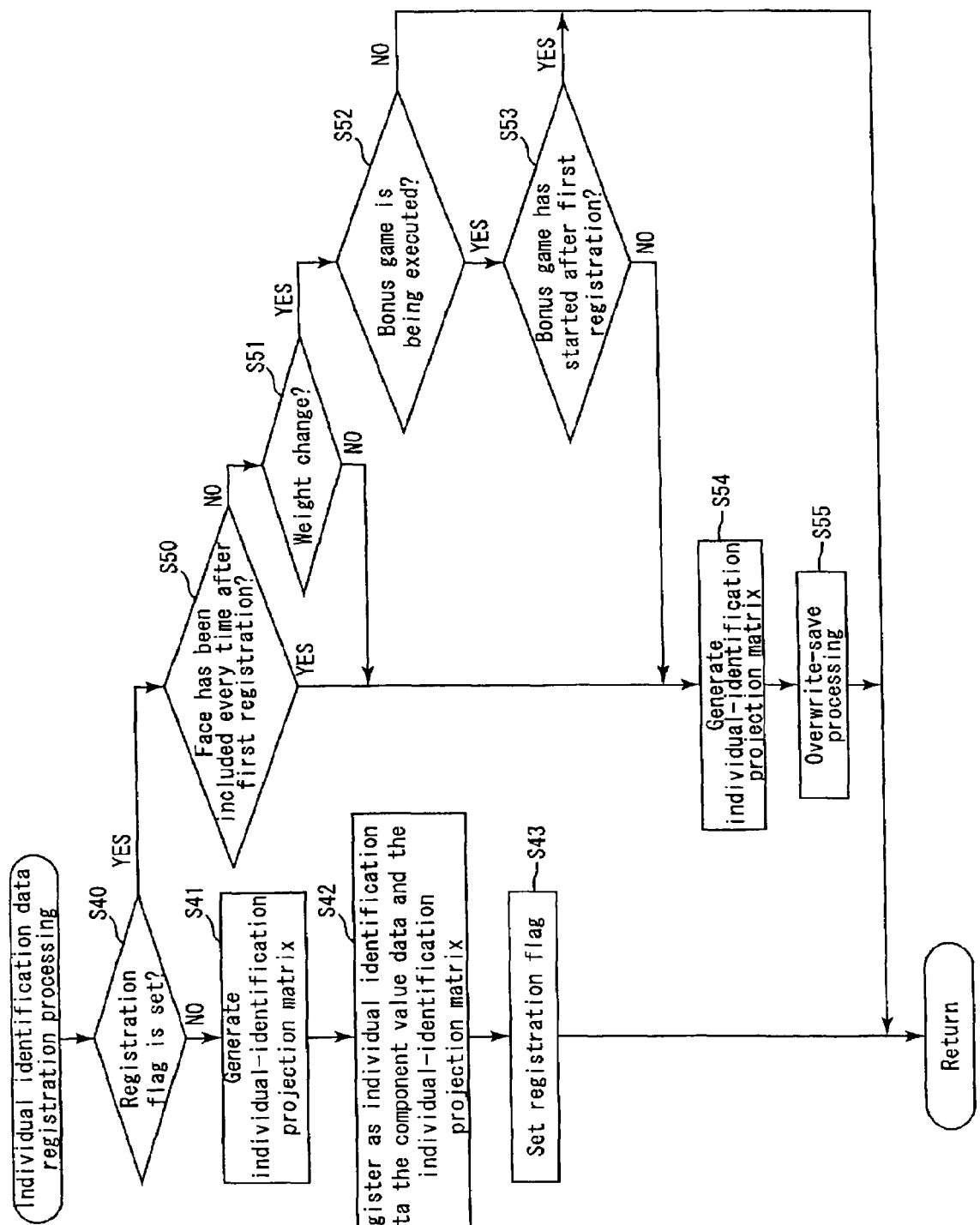
FIG. 7 is a flowchart showing a subroutine of individual identification data registration processing.

Here, the individual identification data registration processing performed in step S17 is described using FIG. 7.

FIG. 7 is a flowchart showing a subroutine of the individual identification data registration processing.

First, the CPU 31 determines whether or not a registration flag has been set (step S40). The registration flag is a flag which is set at the time when individual identification data is first stored after capturing by the CCD camera 21 has been started upon receipt of a capture start signal in step S11 (cf. step S43).

When determining that the registration flag has not been set, the CPU 31 executes processing of step S41 to step S43. On the other hand, when determining that the registration flag has not been set, the CPU 31 executes processing of step S50 to step S55.

First, step S41 to step S43 are described.

In step S41, the CPU 31 performs processing of generating an individual-identification projection matrix. Differently from the above-mentioned projection matrix, the individual-identification projection matrix is generated from facial images of an individual.

The CPU 31 performs principal component analysis on a luminance value vector showing a predetermined number of image data after the processing of step S13, to calculate the individual-identification projection matrix.

It is to be noted that in the present embodiment, the processing of step S12 to step S17 are repeatedly executed until the game is completed in the pachislo gaming machine 100 (cf. step S18); due to this, there is a possibility that the "predetermined number of image data after the processing of step S13" may exist in a plurality of number.

The "predetermined number of image data after the processing of step S13" for use in calculation of the individual-identification projection matrix in step S41 is the newest "predetermined number of image data after the processing of step S13" out of the "predetermined number of image data after the processing of step S13" that can exist in a plurality of number.

Further, the individual-identification projection matrix has been calculated by the principal component analysis in the present embodiment. However, in the present invention, a method for calculating the individual-identification projection matrix is not restricted to principal component analysis. For example, it may be configured such that the individual-identification projection matrix is calculated by independent component analysis, or the like.

It should be noted that, the individual-identification projection matrix is generated from facial images of an individual, and shows facial features of the individual. Although the individual-identification projection matrix is the same as the component value at the point of showing facial features of an individual, the ways of expressing the features are different.

Namely, as described above, the component value is a vector obtained by projecting a luminance value vector showing image data on an individual to a partial space for describing the facial features of a plurality of persons. As opposed to this, the individual-identification projection matrix is a projection matrix for projecting a luminance value vector showing image data on an individual to a partial space for describing facial features of the individual.

As just described, in the present embodiment, the facial features of the individual are shown by two elements, which are the component value and the individual-identification projection matrix.

Next, the CPU 31 stores into the RAM 33 component value data showing the component value calculated in step S30 and individual-identification projection matrix data showing the individual-identification projection matrix calculated in step S41, as individual identification data (step S42).

It is to be noted that as described above, in the present embodiment, the processing of step S12 to step S17 are repeatedly executed until the game is ended in the pachislo gaming machine 100 (cf. step S18), and due to this, there is a possibility that the component value may be repeatedly calculated.

Here, the component value to become the basis of individual identification data that is stored into the RAM 33 is the lastly calculated (the newest) component value.

It is to be noted that, storage of individual identification data in step S42 is hereinafter also referred to as "first registration of individual identification data". This is because there are cases as described later in which, even after storage of individual identification data in step S42, new individual identification data may be written over the stored individual identification data and then saved (cf. step S55).

Next, the CPU 31 sets a registration flag (step S43). As described above, the registration flag is a flag which is set when individual identification data is first stored after capturing by the CCD camera 21 has started upon receipt of an imaging start signal in step S11.

After executing the processing of step S43, the CPU 31 terminates the present subroutine.

In the above, the processing of step S41 to step S43, which is executed when it is determined in step S40 that the registration flag has not been set, has been described.

From here on, the processing of step S50 to step S55, which is executed when it is determined in step S40 that the registration flag has been set, will be described.

In step S50, the CPU 31 determines whether or not information showing a face has been included in all image data received in step S12 after the first registration of the individual identification data, namely, after execution of the processing of step S42.

Figure 8:
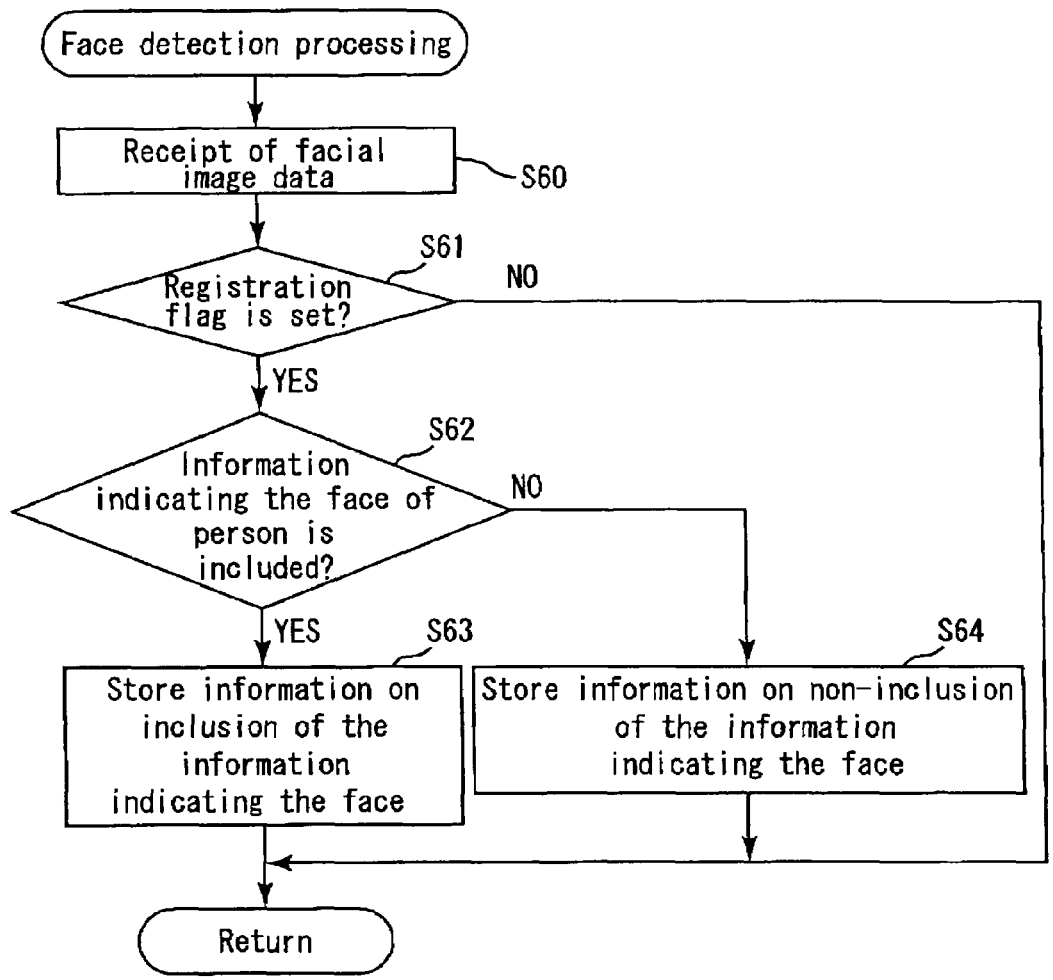
FIG. 8 is a flowchart showing a subroutine of face detection processing.

The processing of step S50 is executed based on the result of face detection processing shown in FIG. 8. Here, the face detection processing is described.

FIG. 8 is a flowchart showing a subroutine of the face detection processing.

In the present embodiment, the CPU 31 is configured to execute processing (face detection processing) of determining whether or not information showing the face of a person is included in image data upon each receipt of the image data from the CCD camera 21, when the registration flag has been set.

First, the CPU 31 receives image data from the CCD camera 21 (step S60).

Next, the CPU 31 determines whether or not the registration flag has been set (step S61). When determining that the registration flag has not been set, the CPU 31 terminates the present subroutine. On the other hand, when determining that the registration flag has been set, the CPU 31 shifts the processing to step S62.

In step S62, the CPU 31 determines whether or not the information showing the face of a person is included in the image data received in step S60.

As the technique for face detection, it is possible to appropriately adopt a known technology.

However, for speedy execution of the processing, it is desirable to adopt a method with as a small amount of calculation as possible. Examples of such a method may include a method of determining whether or not a region of a specific skin color of a human is included in an image, to perform face detection (e.g. see JP-A 2005-242582). Also in the present embodiment, it is possible to adopt a configuration where information on skin colors of humans is previously stored into the EEPROM 34c, and the image processor 34 determines whether or not information on the skin color is included in the image data.

When determining in step S62 that the information showing a face is included, the CPU 31 stores information showing inclusion of the information showing a face, into the RAM 33 (step S63). On the other hand, when determining in step S62 that the information showing a face is not included, the CPU 31 stores information showing non-inclusion of the information showing a face, into the RAM 33 (step S64). After execution of the processing of step S63 or S64, the CPU 31 terminates the present subroutine.

Step S50 in FIG. 7 is executed based on a result of the above face detection processing.

When determining that information showing a face is included in all of the image data received in step S12 after execution of the processing of step S42, the CPU 31 shifts the processing to step S54. On the other hand, when determining that there is image data not including the information showing a face therein out of the image data received in step S12 after executing the processing of step S42, the CPU 31 shifts the processing to step S51.

In step S51, the CPU 31 determines whether or not a weight applied to the seat for the player to sit has changed after the first registration of the individual identification data, namely, after execution of the processing of step S42.

As described above, in the present embodiment, the CPU 31 is connected with the seat sensor 101 through the communication I/F 50. The seat sensor 101 is configured by a pressure sensor, and configured to detect a change in weight applied to the seat when the change occurs, and transmits a weight change detection signal through the communication I/F 50. Therefore, by determining whether or not to have received the signal, the CPU 31 can determine whether or not the weight applied to the seat has changed (perform weight change detection processing).

In the present embodiment, when a weight applied to the seat changes, the seat sensor 101 detects the change, and transmits a signal to the CPU 31. However, in the present invention, the seat sensor may transmit information showing a weight (weigh information) to the CPU of the individual identification data register, and the CPU 31 may detect a change in weight based on the received weight information.

Figure 9:
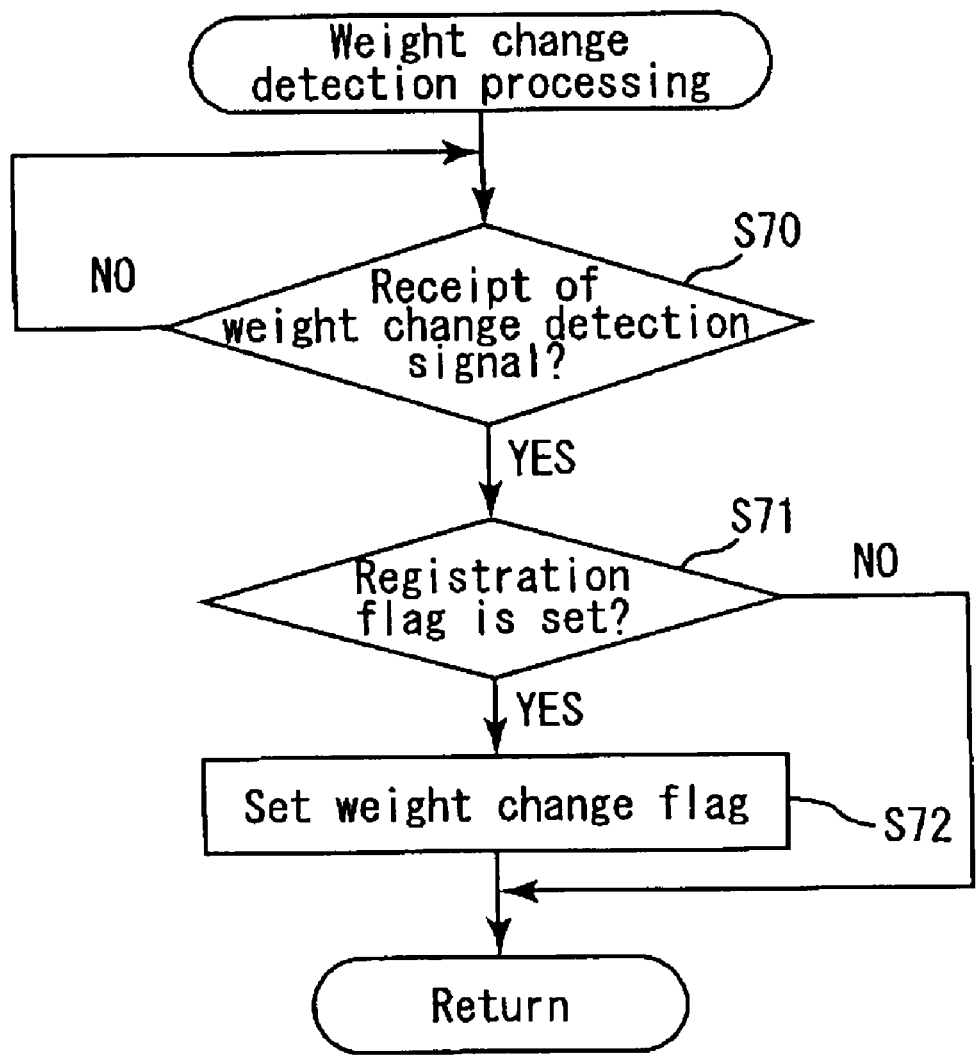
FIG. 9 is a flowchart showing a subroutine of weight change detection processing.

The processing of step S51 is described using FIG. 9.

FIG. 9 is a flowchart showing a subroutine of weight change detection processing.

First, the CPU 31 determines whether or not to have received the weight change detection signal from the seat sensor 101 (step S70). When determining that the weight change detection signal has not been received, the CPU 31 returns the processing to step S70.

On the other hand, when determining that the weight change detection signal has been received, the CPU 31 determines whether or not the registration flag has been set (step S71). When determining that the registration flag has not been set, the CPU 31 terminates the present subroutine.

On the other hand, when determining that the registration flag has been set, the CPU 31 sets a weight change flag (step S72). Namely, the weight change flag shows receipt of the weight change detection signal after the first registration of the individual identification data.

After executing the processing of step S72, the CPU 31 terminates the present subroutine.

In step S51 in FIG. 7, the CPU 31 specifically performs the following processing.

Namely, in step S51, the CPU 31 determines whether or not the weight change flag has been set so as to determine whether or not the weight applied to the seat has been changed after the processing of step S42. When determining that the weight applied to the seat has not been changed, the CPU 31 shifts the processing to step S54. On the other hand, when determining that the weight applied to the seat has changed, the CPU 31 shifts the processing to step S52.

In step S52, the CPU 31 determines whether or not BB or RB is in execution in the pachislo gaming machine 100. BB and RB are hereinafter referred to as "bonus games". BB and RB (bonus games) correspond to the special games in the present invention.

When determining that the bonus game is in execution, the CPU 31 determines whether or not the bonus game has started after the first registration of the individual identification data, namely after execution of the processing of step S42 (step S53). When determining that the bonus game has started not after execution of the processing of step S42, the CPU 31 shifts the processing to step S54.

When determining that the bonus game has started after execution of the processing of step S42, or when determining that the bonus game is not in execution in the pachislo gaming machine, the CPU 31 terminates the present subroutine.

Figure 10A:
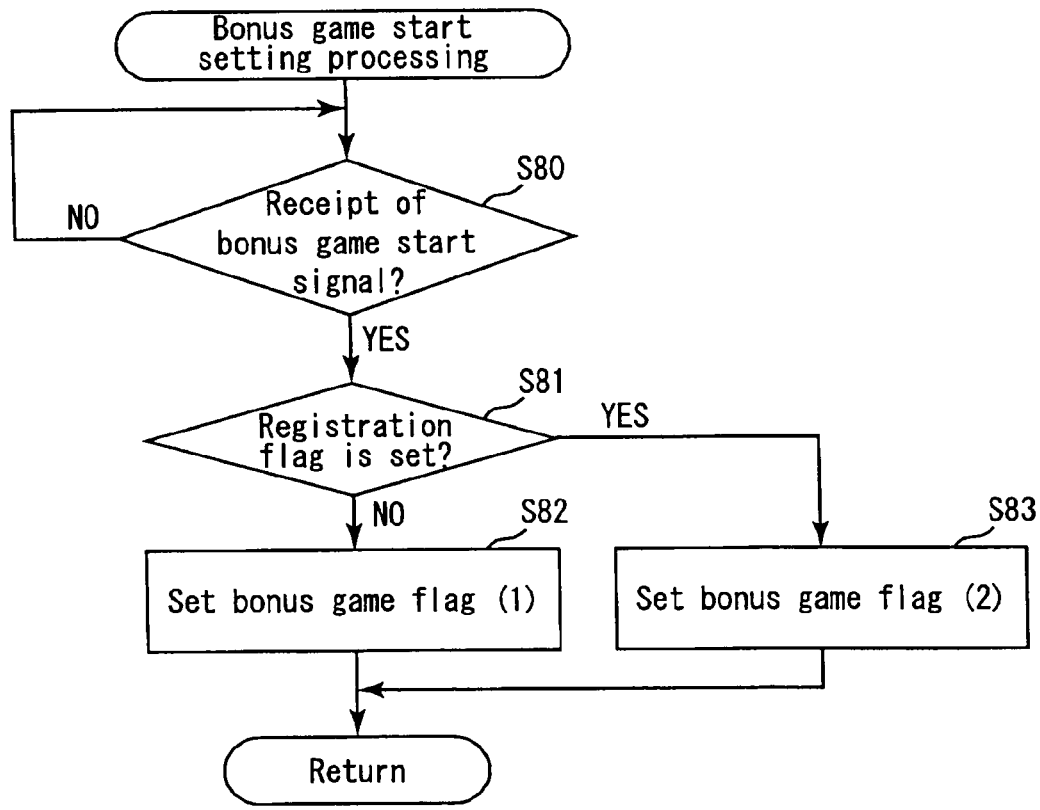
FIG. 10A is a flowchart showing a subroutine of bonus game start setting processing.
Figure 10B:
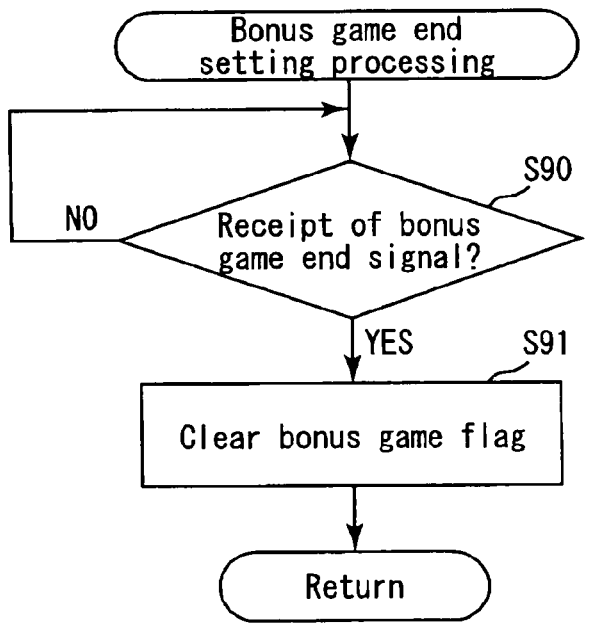
FIG. 10B is a flowchart showing a subroutine of bonus game end setting processing.

Here, the processing of step S52 and step S53 are described in detail using FIG. 10A and FIG. 10B.

FIG. 10A is a flowchart showing a subroutine of bonus game start setting processing.

The bonus game start setting processing is processing executed by the CPU 31 when the bonus game starts in the pachislo gaming machine 100.

Figure 12A:
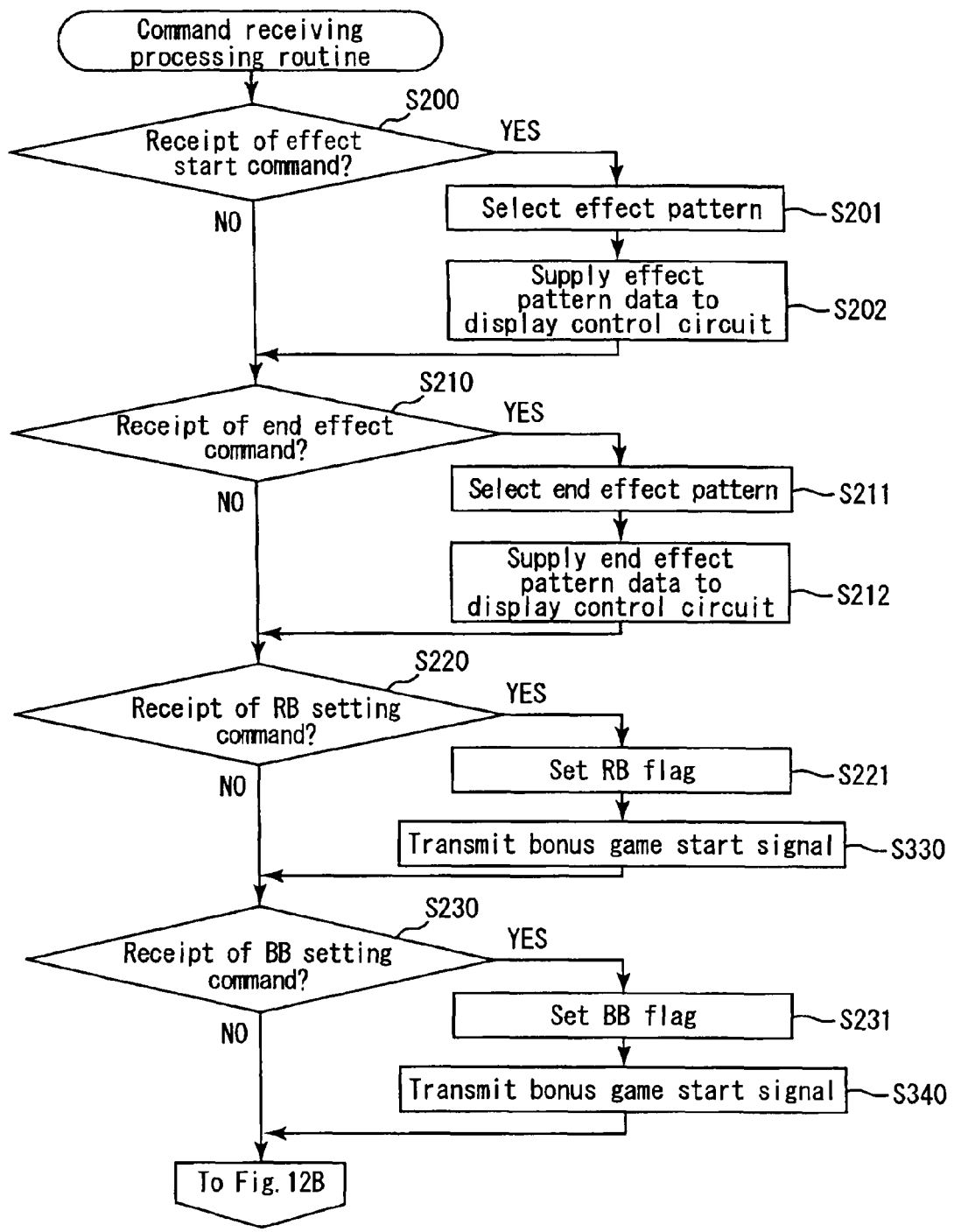
FIG. 12A is a flowchart showing a subroutine of command receiving processing conducted in the sub control circuit of the pachislo gaming machine.

First, the CPU 31 determines whether or not to have received a bonus game start signal (step S80). The bonus game start signal is a signal that is transmitted from the main CPU 141 for gaming machine control when the bonus game starts (cf. step S330 and step S340 in FIG. 12A).

When determining that the bonus game start signal has not been received, the CPU 31 returns the processing to step S80. On the other hand, when determining the bonus game start signal has been received, the CPU 31 determines whether or not the registration flag has been set (step S81).

When determining that the registration flag has not been set, the CPU 31 sets a bonus game flag (1) (step S82). On the other hand, when determining that the registration flag has been set, the CPU 31 sets a bonus game flag (2) (step S83). Namely, the bonus game flag (1) includes information showing that the bonus game has started before the time point of the first registration of the individual identification data. On the other hand, the bonus game flag (2) includes information showing that the bonus game has started after the time point of the first registration of the individual identification data.

After executing the processing of step S82 or step S83, the CPU 31 terminates the present subroutine.

FIG. 10B is a flowchart showing a subroutine of bonus game end setting processing.

The bonus game end setting processing is processing executed by the CPU 31 when the bonus game ends in the pachislo gaming machine 100.

Figure 12B:
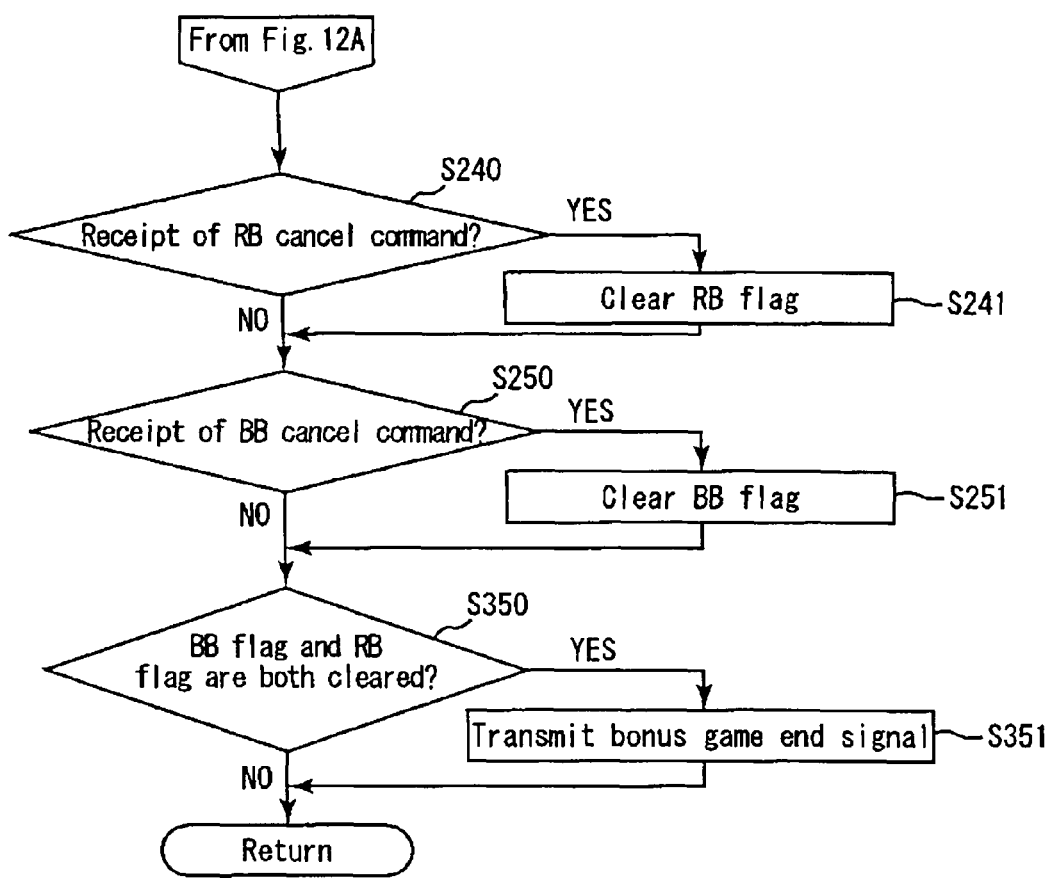
FIG. 12B is a flowchart showing the subroutine of the command receiving processing conducted in the sub control circuit of the pachislo gaming machine.

First, the CPU 31 determines whether or not to have received a bonus game end signal (step S90). The bonus game end signal is a signal transmitted from the main CPU 141 for gaming machine control when the bonus games (both BB and RB) have ended (cf. step S351 in FIG. 12B).

When determining that that the bonus game end signal has not been received, the CPU 31 returns the processing to step S90. On the other hand, when determining that the bonus game end signal has been received, the CPU 31 clears the bonus game flag (1) and the bonus game flag (2) (step S91).

After executing the processing of step S91, the CPU 31 terminates the present subroutine.

In the above, the bonus game start setting processing and the bonus game end setting processing have been described using FIG. 10A and FIG. 10B.

On the basis of results of the bonus game start setting processing and the bonus game end setting processing, the CPU 31 specifically executes the following processing in step S52 and step S53.

In step S52, the CPU 31 determines whether or not the bonus game flag (1) or the bonus game flag (2) has been set.

The determination by the CPU 31 that the bonus game flag (1) or the bonus game flag (2) has been set corresponds to the determination that the bonus game is in execution in the pachislo gaming machine 100. On the other hand, the determination that neither the bonus game flag (1) nor the bonus game flag (2) has been set corresponds to the determination that the bonus game is not in execution in the pachislo gaming machine 100.

In step S53, the CPU 31 determines whether the bonus game flag (1) or the bonus game flag (2) has been set.

The determination by the CPU 31 that the bonus game flag (1) has been set corresponds to the determination that the bonus game has started not after execution of the processing of step S42. On the other hand, the determination by the CPU 31 that the bonus game flag (2) has been set corresponds to the determination that the bonus game has started after execution of the processing of step S42.

When determining in step S53 that the bonus game has started not after execution of the processing of step S42, the CPU 31 performs processing of generating an individual-identification projection matrix (step S54). The individual-identification projection matrix has been already described in step S41, and hence the description thereof is omitted here.

Next, the CPU 31 stores, into the RAM 33, component value data showing the component value calculated in step S30 and individual-identification projection matrix data showing the individual-identification projection matrix calculated in step S54, as new individual identification data, in place of the individual identification data lastly stored out of the individual identification data stored in the RAM 33 in step S43 or step S55 (step S55).

It is to be noted that, as described above, the processing of step S12 to step S17 are repeatedly executed until the game is ended in the pachislo gaming machine 100 (cf. step S18); due to this, there is a possibility that the component value and the individual-identification projection matrix may be repeatedly calculated.

Here, in step S55, the component value and the individual-identification projection matrix to become the basis of the individual identification data that is stored in the RAM 33 are the lastly calculated (the newest) component value and individual-identification projection matrix.

Namely, in step S55, the CPU 31 performs processing of writing the latest component value and individual-identification projection matrix and storing the data over the individual identification data (overwrite-save processing).

After performing the processing of step S55, the CPU 31 terminates the present subroutine.

As described above, the overwrite-save processing of step S55 is performed when the minimum error is again determined to be the predetermined threshold value or more after the individual identification data has been once registered in step S42, and when any one condition out of the following three conditions is satisfied.

<1> The information showing a face is included in all image data received after the first registration of the individual identification data.

<2> The change in weight is not detected after the first registration of the individual identification data.

<3> The bonus game has continued since the first registration of the individual identification data.

Namely, when the conditions of <1> to <3> are satisfied, there is a high probability that the persons being captured by the CCD camera 21 after the first registration of the individual identification data are the same person. As thus described, in the present invention, when there is a high probability that the persons being captured by the CCD camera 21 after the first registration of the individual identification data are the same person, component value data showing a newly calculated component value is written over the component value data and stored. This is because, the determination that the newly captured person is not any of the persons registered in the individual identification data register in the above state indicates that the newly calculated component value (and individual-identification projection matrix) describes the facial features of the person more accurately than the previously registered component value.

In response to this, in the present embodiment, a configuration has been adopted where the CPU 31 determines that the persons being captured by the CCD camera 21 are the same person in the case of any one of the below <1> to <3> (processing (E) in the present invention), and rewrites the individual identification data (processing (C-2) in the present invention).

<1> the case of determining that the information showing a face is included in all image data received in step S12 after execution of the processing of step S42 (step S50: YES)

<2> the case of determining that the weight applied to the seat for the player to sit has not changed after execution of the processing of step S42 (step S51: NO)

<3> the case of determining that the bonus game is in execution in the pachislo gaming machine 100 (step S52: YES), and also determining that the bonus game has started not after execution of the processing of step S42 (step S53: NO).

In the present embodiment, it is determined in step S50 whether or not the information showing a face is included in all of the image data received in step S12 "after execution of the processing of step S42", it is determined in step S51 whether or not the weight applied to the seat for the player to sit has changed "after execution of the processing of step S42", and it is determined in step S53 whether or not the bonus game has started "after execution of the processing of step S42". However, in the present invention, the reference time for these determinations is not restricted to the time point of the processing of step S42. For example, the time point when capturing of images is lastly performed by the CCD camera 21 before step S42 may be the reference time for these determinations.

In this case, for example, the processing of step S50 is as follows.

Namely, the CPU 31 determines whether or not the information showing a face is included in all of the image data received in step S12 after the time point of the last image capturing by the CCD camera 21 before step S42.

In the above, the processing of step S17 in FIG. 5 has been described using FIG. 7.

After executing the processing of step S17, or when determining in step S16 that the minimum error is the predetermined threshold value or more, the CPU 31 determines whether or not to have received a game end signal (step S18). The game end signal is a signal transmitted from the main CPU 141 for gaming machine control when a predetermined time period has elapsed with the credit in the state of 0, or when a predetermined time period has elapsed with the start lever in the state of not being turned ON (cf. step S312 and step S321 in FIG. 11A).

When determining that the game end signal has not been received, the CPU 31 shifts the processing to step S12.

On the other hand, when determining that the game end signal has been received, the CPU 31 clears the registration flag (step S19), and clears the weight change flag (step S20). The CPU 31 then transmits a capture end signal to the CCD camera 21 (step S21). Upon receipt of this signal, the CCD camera 21 ends capturing of images.

After executing the processing of step S21, the CPU 31 terminates the main processing.

In the above, the processing performed in the individual identification data register 10 has been described.

In the following, the processing performed in the pachislo gaming machine 100 is described.

Figure 11A:
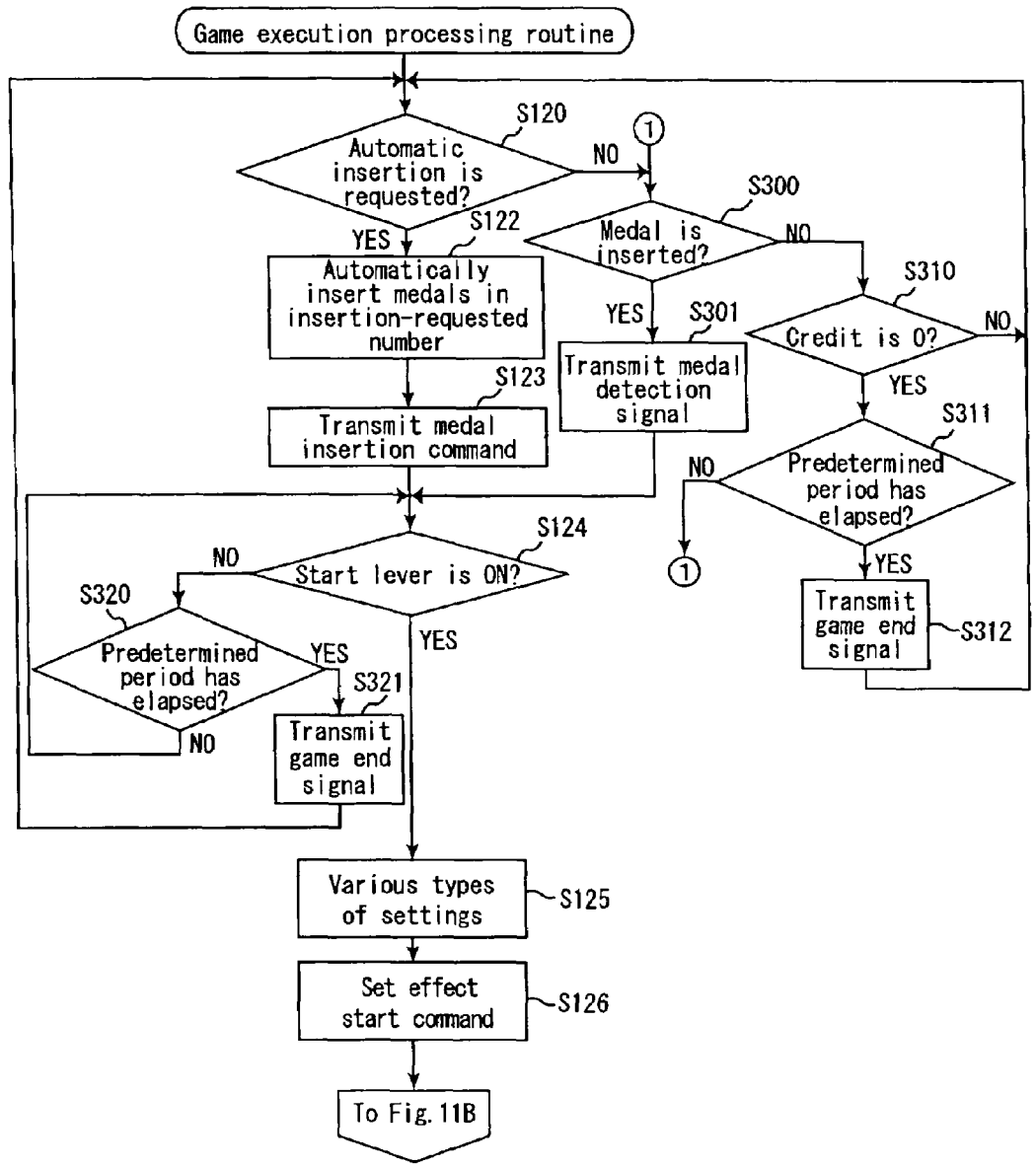
FIG. 11A is a flowchart showing a main routine of game execution processing conducted in a main control circuit of the pachislo gaming machine.
Figure 11B:
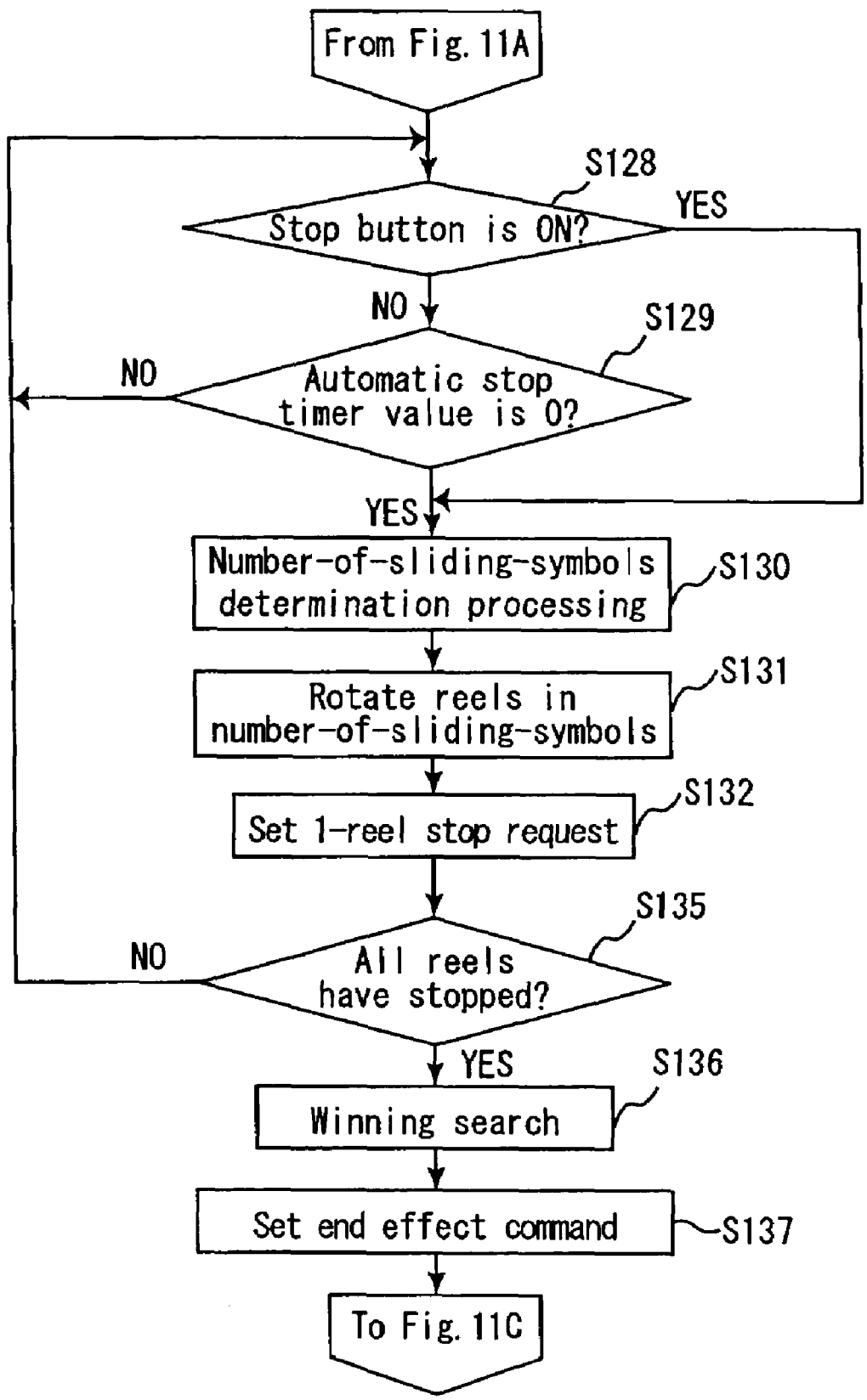
FIG. 11B is a flowchart showing the main routine of the game execution processing conducted in the main control circuit of the pachislo gaming machine.
Figure 11C:
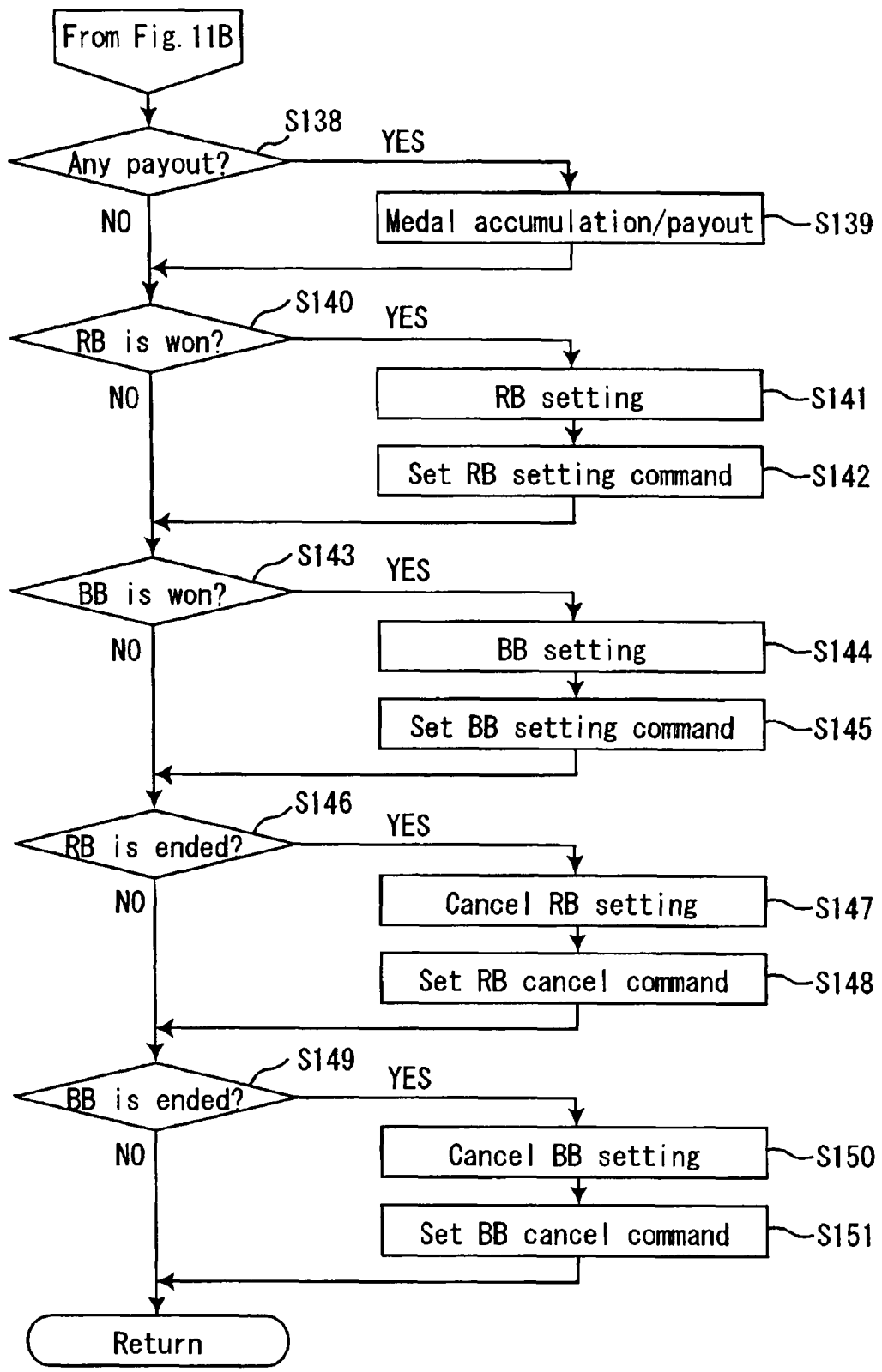
FIG. 11C is a flowchart showing the main routine of the game execution processing conducted in the main control circuit of the pachislo gaming machine.

FIG. 11A to FIG. 11C are flowcharts showing a main routine of the game execution processing performed in the main control circuit.

First, the main CPU 141 for gaming machine control determines whether or not a request for automatic medal insertion has been made (step S120). It is to be noted that the case where the request for automatic insertion has been made is a case where winning for replay has been established in the previous game. When the request for automatic medal insertion has been made, the main CPU 141 for gaming machine control automatically inserts medals in number requested (step S122), and transmits a medal insertion command to the sub control circuit 182 (step S123).

On the other hand, when determining in step S120 that the request for automatic medal insertion has not been made, the main CPU 141 for gaming machine control determines whether or not medals have been inserted (step S300). Namely, the main CPU 141 for gaming machine control determines whether or not to have received a detection signal issued by the inserted medal sensor 122S having detected insertion of medals into the medal insertion slot 122, or whether or not to have received a detection signal issued from the BET switch (1-BET switch 111 or maximum BET switch 113), to determine whether or not medals have been inserted. It should be noted that, when determining that the detection signal issued from the BET switch (1-BET switch 111 or maximum BET switch 113) has been received, the main CPU 141 for gaming machine control performs processing of subtracting the number of credits corresponding to the number of BET medals from the number of credits stored in the RAM 143.

When determining in step S300 that medals have been inserted, the main CPU 141 for gaming machine control transmits a medal detection signal to the CPU 31 of the individual identification data register 10 (step S301). The medal detection signal is a signal showing insertion of medals. As described above, the CPU 31 starts the main processing shown in FIG. 5, upon receipt of the medal detection signal.

When determining in step S300 that medals have not been inserted, the main CPU 141 for gaming machine control shifts the processing to step S310.

In step S310, the main CPU 141 for gaming machine control determines whether or not the number of credits stored in the RAM 143 is 0. When determining that the number of credits is not 0, the main CPU 141 for gaming machine control returns the processing to step S120. On the other hand, when determining that the number of credits is 0, the main CPU 141 for gaming machine control shifts the processing to step S311.

In step S311, the main CPU 141 for gaming machine control determines whether or not a predetermined time period has elapsed after stopping of rotation of the rotation reels 103L, 103C and 103R. When determining that the predetermined time period has not elapsed, the main CPU 141 for gaming machine control returns the processing to step S300. On the other hand, when determining that the predetermined time period has elapsed, the main CPU 141 for gaming machine control shifts the processing to step S312.

In step S312, the main CPU 141 for gaming machine control transmits a game end signal to the CPU 31 of the individual identification data register 10. The game end signal is a signal showing that the game has been ended in the pachislo gaming machine 100. As described above, the CPU 31 ends the main processing in FIG. 5, upon receipt of the game end signal.

After executing the processing of step S312, the main CPU 141 for gaming machine control returns the processing to step S120.

After executing the processing of step S301 or after executing the processing of step S123, the main CPU 141 for gaming machine control determines whether or not the start lever 106 has been operated (step S124). Namely, the main CPU 141 for gaming machine control determines whether or not an input signal has been received from the start switch 106S.

When determining in step S124 that the start lever 106 has not been operated, the main CPU 141 for gaming machine control shifts the processing to step S320.

In step S320, the main CPU 141 for gaming machine control determines whether or not a predetermined time period has elapsed since stoppage of the rotation of the rotation reels 103L, 103C and 103R. When determining that the predetermined time period has not elapsed, the main CPU 141 for gaming machine control returns the processing to step S124. On the other hand, when determining that the predetermined time period has elapsed, the main CPU 141 for gaming machine control shifts the processing to step S321.

In step S321, the main CPU 141 for gaming machine control transmits a game end signal to the CPU 31 of the individual identification data register 10. The game end signal is a signal showing that the game has been ended in the pachislo gaming machine 100. As described above, the CPU 31 ends the main processing in FIG. 5, upon receipt of the game end signal.

After executing the processing of step S312, the main CPU 141 for gaming machine control returns the processing to step S120.

When determining in step S124 that the start lever 106 has been operated, the main CPU 141 for gaming machine control performs processing relating to a variety of settings (step S125). In this variety-of-setting processing, a random number is sampled from the random number generator 246 at a timing of operation of the start lever 106, and lottery processing of generating internal winning combination (winning flag) is conducted based on the sampled random number value and the lottery probability table set in the RAM 143. Further, in this variety-of-setting processing, for example, WIN lamp lighting lottery processing, processing relating to selection of stop control table for stopping a rotation reel, processing of initialization for the reel rotation, and the like, are performed, and rotation of the rotation reels 103 (103L, 103C, 103R) is started.

After start of rotation of the rotation reels 103L, 103C and 103R, the numbers of drive pulses transmitted to the respective stepping motors 159L, 159C and 159R are counted, and the counted values are stored into the RAM 143. Reset pulses are obtained from the rotation reels 103L, 103C and 103R in each rotation, and these pulses are input into the main CPU 141 for gaming machine control through the reel position detection circuit 160. By the reset pulses as thus obtained, the counted values of the drive pulses are cleared to "0" in the RAM 143. In this manner, the count values corresponding to the rotational positions within the range of one rotation of the rotation reels 103L, 103C and 103R are stored in the RAM 143.

Further, in the symbol table stored in the ROM 142 for associating the rotational positions of the rotation reels 103L, 103C and 103R with the symbols drawn on the peripheral surfaces of the rotation reels, with the rotational positions generated by the foregoing reset pulses taken as references, code numbers sequentially offered per certain rotational pitch of the rotation reels 103L, 103C and 103R are associated with symbol codes showing symbols provided for the respective code numbers. Further, the winning symbol-combination table stored in the ROM 142 is referenced when the rotation reels 103L, 103C and 103R are stop-controlled or when winning is checked after stopping of all of the rotation reels. After executing the processing of step S125, the main CPU 141 for gaming machine control shifts the processing to step S126.

In step S126, the main CPU 141 for gaming machine control sets an effect start command in the RAM 143. This effect start command is a command for starting display of a predetermined effect image to the liquid crystal display 105, and includes data on the internal winning combination determined in the above lottery processing. The effect start command is supplied to the sub control circuit 182 at a predetermined timing.

After executing the processing of step S126, the main CPU 141 for gaming machine control shifts the processing to step S128.

In step S128, the main CPU 141 for gaming machine control determines whether or not the stop buttons 107 (107L, 107C, 107R) have been "ON", by the presence or absence of an input signal from the reel stop signal circuit 156 (step S128). When determining that the stop button 107 has not been "ON", the main CPU 141 for gaming machine control determines whether or not a value of the automatic stop timer is "0" (step S129). When determining that the value of the timer is not "0", the main CPU 141 for gaming machine control returns the processing to step S128.

On the other hand, when determining in step S128 that the stop button 107 has been "ON", or when determining in step S129 that the value of the automatic stop timer is "0", the main CPU 141 for gaming machine control stops rotation of the rotation reel 103 corresponding to the stop button 107. At this time, the number of sliding symbols is determined based on a winning request (meaning an internal winning combination), symbol positions (rotational positions of the rotation reel 103 in operation), a stop control table selected and the like (step S130).

Next, the main CPU 141 for gaming machine control performs processing of rotating and stopping the rotation reel 103 by the number of sliding symbols determined in step S130 (step S131), and sets a stop request regarding one rotation reel 103 (step S132).

Next, the main CPU 141 for gaming machine control determines whether or not all of the three rotation reels 103 (103L, 103C, 103R) have stopped (step S135). When determining that all of the rotation reels 103 have not stopped, the main CPU 141 for gaming machine control returns the processing to step S128. On the other hand, when determining that all of the rotation reels 103 have stopped, the main CPU 141 for gaming machine control performs winning detection (step S136). At this time, the winning symbol-combination table stored in the ROM 142, or the like, is referenced. Further, the main CPU 141 for gaming machine control may determine whether or not the winning flag is normal, and may display an illegal error and discontinue the processing when determining that the flag is not normal.

Next, the main CPU 141 for gaming machine control sets an end effect command in the RAM 143 (step S137). This end effect command is a command for displaying an effect image of the game-end time according to a game result, and includes data regarding a result of winning detection in step S136. The end effect command is supplied to the sub control circuit 182 at a predetermined timing.

Next, the main CPU 141 for gaming machine control determines whether or not medals are to be paid out, namely the presence or absence of the number of medals for winning (step S138).

When determining that medals are to be paid out, the main CPU 141 for gaming machine control accumulates or pays out medals in number according to the gaming state and the winning combination (step S139). In the case of accumulating medals, the main CPU 141 for gaming machine control performs processing of adding the number of medals to the number of credits stored in the RAM 143. On the other hand, in the case of paying out medals, the main CPU 141 for gaming machine control transmits a payout command signal to the hopper drive circuit 151, to pay out a predetermined number of medals from the hopper 150. At this time, the medal detecting portion 150S counts the number of medals paid out from the hopper 150, and when the counted value reaches a specified number, a medal payout completion signal is input to the main CPU 141 for gaming machine control. Thereby, the main CPU 141 for gaming machine control stops driving of the hopper 150 through the hopper drive circuit 151, and completes the medal payout processing.

Next, the main CPU 141 for gaming machine control determines whether or not RB has been won (step S140). When determining that RB has been won, the main CPU 141 for gaming machine control performs processing relating to setting of RB (step S141). In this step S141, the main CPU 141 for gaming machine control performs processing relating to setting of a lottery probability table for RB and a winning symbol-combination table for RB. Further, in this step S141, the main CPU 141 for gaming machine control starts counting of the number of times of RB game winnings, and the like, and starts processing of displaying the count value to the number-of-actuated-combinations display portion 120. After executing the processing of step S141, the main CPU 141 for gaming machine control shifts the processing to step S142.

In step S142, the main CPU 141 for gaming machine control sets an RB setting command in the RAM 143. The RB setting command is a command for displaying the effect image for RB as the screen image to the liquid crystal display 105, and is supplied to the sub control circuit 182 at a predetermined timing.

When determining in step S140 that RB has not been won, or when executing processing of step S142, the main CPU 141 for gaming machine control determines whether or not BB has been won (step S143). When determining that BB has been won, the main CPU 141 for gaming machine control performs processing relating to setting of BB (step S144). In this step S144, the main CPU 141 for gaming machine control performs processing relating to setting of a lottery probability table for BB, a winning symbol-combination table for BB, and the like. Further, in step S144, the main CPU 141 for gaming machine control starts counting of the number of times of BB games played, display of the counted value to the number-of-actuated-combinations display portion 120, counting of the number of paid-out medals, and the like. Thereafter, the main CPU 141 for gaming machine control shifts the processing to step S145.

In step S145, the main CPU 141 for gaming machine control sets a BB setting command in the RAM 143. The BB setting command is a command for displaying the effect image for BB as the screen image, to the liquid crystal display 105, and is supplied to the sub control circuit 182 at a predetermined timing.

When determining in step S143 that BB has not been won, or when executing the processing of step S145, the main CPU 141 for gaming machine control determines whether or not RB has been ended (step S146). When determining that RB has been ended, the main CPU 141 for gaming machine control performs processing relating to canceling of setting of RB (step S147). In step S147, the main CPU 141 for gaming machine control performs processing relating to a change in setting from the lottery probability table for RB, the winning symbol-combination table for RB, and the like, which have been set in step S141, to the lottery probability table for use in a normal gaming state (other than RB or BB). Thereafter, the main CPU 141 for gaming machine control shifts the processing to step S148.

In step S148, the main CPU 141 for gaming machine control sets an RB cancel command in the RAM 143. The RB cancel command is a command for stopping the effect image for RB as the screen image, and displaying a normal (other than PB or BB) effect image to the liquid crystal display 105. The RB cancel command is supplied to the sub control circuit 182 at a predetermined timing.

When not determining in step S146 that the RB has been ended, or when executing the processing of step S148, the main CPU 141 for gaming machine control determines whether or not BB has been ended (step S149). When determining that BB has been ended, the main CPU 141 for gaming machine control next performs processing relating to canceling of setting of BB (step S150). In step S150, the main CPU 141 for gaming machine control performs processing relating to a change in setting from the lottery for BB and the lottery probability table for BB, the winning symbol-combination table for BB, and the like, which have been set in step S144, to the lottery probability table for use in the normal gaming state (other than RB or BB). Thereafter, the main CPU 141 for gaming machine control shifts the processing to step S151.

In step S151, the main CPU 141 for gaming machine control sets a BB cancel command in the RAM 143. The BB cancel command is a command for stopping the effect image for BB as the screen image, and displaying a normal (other than PB or BB) effect image to the liquid crystal display 105. The BB cancel command is supplied to the sub control circuit 182 at a predetermined timing.

When determining in step S149 that the BB has not been ended, or when executing the processing of step S151, the main CPU 141 for gaming machine control terminates the present subroutine.

FIG. 12 is a flowchart showing a subroutine of command receiving processing performed in the sub control circuit.

First, in step S200, the sub CPU 306 for gaming machine control determines whether or not to have received an effect start command. When determining that the effect start command has not been received, the sub CPU 306 for gaming machine control shifts the processing to step S210.

On the other hand, when determining that the effect start command has been received, the sub CPU 306 for gaming machine control selects an effect pattern corresponding to the command, out of a plurality of types of effect patterns stored in the program ROM 308.

The effect patterns include a variety of data of displaying an effect image to the liquid crystal display 105, such as the types of effect images and display periods thereof and the like. For example, in the normal gaming state (gaming state other than BB or RB), the sub CPU 306 for gaming machine control selects an effect pattern for displaying an effect image of the normal time.

Further, when the RB flag has been set, the sub CPU 306 for gaming machine control selects an effect pattern for displaying an effect image in execution of RB. Further, when the BB flag has been set, the sub CPU 306 for gaming machine control selects an effect pattern for displaying an effect image in execution of BB.

Next, in step S202, the sub CPU 306 for gaming machine control supplies the display-control circuit 350 with data showing the effect pattern.

When determining in step S200 that the effect start command has not been received, or when executing the processing of step S202, the sub CPU 306 for gaming machine control determines whether or not to have received an end effect command (step S210).

When determining that the end effect command has not been received, the sub CPU 306 for gaming machine control shifts the processing to step S220.

On the other hand, when determining that the end effect command has been received, in step S211, the sub CPU 306 for gaming machine control selects an end effect pattern corresponding to the command, out of a plurality of types of end effect patterns stored in the program ROM 308.

The end effect patterns include a variety of data for displaying an effect image to the liquid crystal display 105, such as the types of effect images and display periods thereof. For example, when BB is won, the sub CPU 306 for gaming machine control selects an end effect pattern for displaying an effect image of the BB winning time. Further, when a small combination is won, the sub CPU 306 for gaming machine control selects an end effect pattern for displaying an effect image of the small combination winning time.

Next, in step S212, the sub CPU 306 for gaming machine control supplies the display-control circuit 350 with data showing the end effect pattern.

When determining in step S210 that the end effect command has not been received, or when executing the processing of step S212, the sub CPU 306 for gaming machine control determines whether or not to have received an RB setting command (step S220). When determining that the RB setting command has not been received, the sub CPU 306 for gaming machine control shifts the processing to step S230. On the other hand, when determining that the RB setting command has been received, the sub CPU 306 for gaming machine control sets an RB flag in step S221. The RB flag is a flag that is set at start of RB and cleared at end of RB.

The sub CPU 306 for gaming machine control then transmits a bonus game start signal to the CPU 31 of the individual identification data register 10 (step S330). The bonus game start signal is a signal showing that the bonus game has started.

After executing the processing of step S330, the sub CPU 306 for gaming machine control shifts the processing to step S230.

In step S230, the sub CPU 306 for gaming machine control determines whether or not to have received a BB setting command. When determining that the BB setting command has not been received, the sub CPU 306 for gaming machine control shifts the processing to step S240. On the other hand, when determining that the BB setting command has been received, the sub CPU 306 for gaming machine control sets a BB flag in step S231. The BB flag is a flag that is set at start of BB and cleared at end of BB.

The sub CPU 306 for gaming machine control then transmits a bonus game start signal to the CPU 31 of the individual identification data register 10 (step S340).

After executing the processing of step S340, the sub CPU 306 for gaming machine control shifts the processing to step S240.

When determining in step S230 that the BB setting command has not been received, or when executing the processing of step S340, the sub CPU 306 for gaming machine control determines whether or not to have received the RB cancel command (step S240). When determining that the RB cancel command has been received, the sub CPU 306 for gaming machine control clears the RB flag (step S241).

When determining in step S240 that the RB cancel command has not been received, or when executing the processing of step S241, the sub CPU 306 for gaming machine control determines whether or not the BB cancel command has been received (step S250). When determining that the BB cancel command has been received, the sub CPU 306 for gaming machine control clears the BB flag (step S251).

After executing the processing of step S251, or when determining in step S250 that the BB cancel command has not been received, the sub CPU 306 for gaming machine control determines whether or not both the BB flag and the RB flag have been cleared (step S350). When determining that both the BB flag and the RB flag have been cleared, the sub CPU 306 for gaming machine control transmits a bonus game end signal to the CPU 31 of the individual identification data register (step S351). The bonus game end signal is a signal showing that the bonus game has been ended.

After executing the processing of step S351 or when determining in step S350 that at least either the BB flag or the RB flag has been set, the sub CPU 306 for gaming machine control terminates the present subroutine.

In the above, the present embodiment has been described.

According to the individual identification data register 10 of the present embodiment, when it is determined that a person being captured by the CCD camera 21 is not any of the previously registered persons, individual identification data showing facial features of the person being captured is newly registered. Namely, according to the individual identification data register 10 of the present embodiment, individual identification data can be registered simultaneously with performance of recognition.

In the conventional face recognition device, some processing (e.g. unlocking) is performed only when it is determined that the person being captured by the CCD camera 21 is the previously registered person, and special processing is not performed when it is determined that the person being captured by the CCD camera 21 is not any of the previously registered persons.

As opposed to this, according to the individual identification data register 10 of the present embodiment, when it is determined that the person being captured by the CCD camera 21 is not the previously registered person, individual identification data is newly registered.

According to the individual identification data register 10 of the present embodiment, a plurality of component values are calculated based on a plurality of image data.

Therefore, since comparison is performed based on data showing a plurality of component values, it is possible to realize comparison with high accuracy.

According to the individual identification data register 10 of the present embodiment, when it is determined that the individual identification data showing a component value with an error being smaller than the predetermined threshold value is not stored in the storage device, a individual-identification projection matrix is generated based on the image data showing the face of the person obtained by the CCD camera 21. Then, individual-identification projection matrix data showing the individual-identification projection matrix is registered along with the component value data, as individual identification data.

The individual-identification projection matrix shows the facial features of a person as does the component value, but is different from the component value. Therefore, the registered individual identification data precisely shows the facial features of the person since the individual identification data to be registered includes two types of information, which are the component value and the individual-identification projection matrix.

According to the individual identification data register 10 of the present embodiment, when it is determined that the individual identification data showing a component value with an error being the predetermined threshold value or more is not stored in the storage device even though it is determined again that the person being captured by the CCD camera 21 remains unchanged after the individual identification data on some person has been once registered, new individual identification data is overwrite-saved.

It is therefore possible to update the individual identification data on the person to data more precisely showing the facial features of the person.

According to the individual identification data register 10 of the present embodiment, it is determined that persons being captured by the CCD camera 21 from the time point when individual identification data on some person has been once registered to the current time point are the same person, when it is determined that all of the image data obtained by the CCD camera 21 include information showing the face of the person during that time period. The possibility is high that the same person continuously exists within the capture range during the time, when it is not determined that the image data does not include information on the face of the person. Accordingly, based on this determination, the processing of overwrite-save can be performed.

According to the individual identification data register 10 of the present embodiment, a weight applied to a seat for the person captured by the CCD camera 21 to sit is measured, and based on the measured weight, it is determined whether or not persons being captured by the CCD camera 21 from the time point when individual identification data on some person has been once registered to the current time point are the same person. In a case where the weight applied to the seat remains unchanged, or in some other case, both possibilities that the person has left the seat and that another person has sat in the seat are low. Therefore, in such a case, it can be determined that the person being captured by the CCD camera 21 remains unchanged, and the processing of overwrite-save can be conducted.

Further, the individual identification data register 10 of the present embodiment is adjunctively installed in the pachislo gaming machine 100. It is determined that persons being captured by the CCD camera 21 from the time point when a bonus game started to the current time point are the same person, when the bonus game, which is a game relatively advantageous for a player, is executed as a game to be executed in the pachislo gaming machine 100. During execution of the bonus game, the possibility that the player leaves the place is low. Therefore, in such a case, it can be determined that the person being captured by the CCD camera 21 remains unchanged, and the above processing of overwrite-save can be conducted.

Further, as in the present embodiment, benefits as follows can be received by adopting the configuration of adjunctively installing the individual identification data register 10 to the pachislo gaming machine 100.

First, according to the present embodiment, when a player plays a game for the first time on the pachislo gaming machine 100 including the individual identification data register 10, individual identification data on the player is registered. It is therefore possible to count the number of players who have played a game in the pachislo gaming machine 100. Such information showing the number of players is applicable, for example to marketing information and the like, and highly useful. It is possible to obtain such useful information by adjunctively installing the individual identification data register 10 to the pachislo gaming machine 100.

Moreover, a player who plays a game in a gaming machine such as a pachislo gaming machine typically has specific game preferences. There are many players who, for example, have particularly favorite images and music with regard to images and music used in the gaming machine. Among those players, some often go to a gaming facility in the expectation of enjoying their target images and music.

According to such a tendency of the players, a gaming machine capable of providing each player with a game meeting his or her preferences is extremely attractive. Such a gaming machine can also be provided, for example, by a method of making the player input player information for an ID card or the like.

However, when face recognition is utilized in providing a service to each player, a different appeal can be added to the gaming machine. The reason for this is as follows. Since the face recognition is normally utilized for entrance/exit control, suspicious person monitoring, and the like, and is not a sort of system utilized for the instance of playing a game in the gaming machine, a gaming machine capable of conducting face recognition can create a different and attractive space in the gaming facility having the gaming machine.

In order to provide such a gaming machine, the individual identification data register may, for example, be configured as follows.

Namely, when individual identification data on a new player is registered, the individual identification data register stores information showing game preferences of the player in a game and an effect image relating to the game (preference information) is stored in association with the individual identification data.

Then, when the player being captured by the camera is determined to be the already registered player in a recognition stage, a signal showing the preference information corresponding to the individual identification data on the player is transmitted to the gaming machine. Upon receipt of the signal, the gaming machine executes a game corresponding to the preferences of the player.

The use of the face recognition for the instance of playing a game in the gaming machine is an extremely innovative idea. Hence there is no doubt that such an idea can make a gaming machine including the individual identification data register filled with high entertainment properties.

It is to be noted that the above description is a description regarding an effect specific to the present invention that is exerted in the case of attaching the individual identification data register of the present invention to a gaming machine, and is only a description of one embodiment according to the present invention. It does not denote that the individual identification data register according to the present invention needs to be attached to the gaming machine.

Although the present invention has been described with reference to embodiments thereof, these embodiments merely illustrate specific examples, not restrict the present invention. The specific structures of respective means and the like can be designed and changed as required. Furthermore, there have been merely described the most preferable effects of the present invention, in the embodiments of the present invention. The effects of the present invention are not limited to those described in the embodiments of the present invention.

What is claimed as new and desired to be secured by Letters Patent of the United States is:

1. An individual identification data register comprising:
   a camera that captures an image of a face of a person;
   a storage device; and
   an arithmetic processing device, wherein
   said storage device stores projection matrix data showing a projection matrix generated from first image data obtained by capturing images of faces of a plurality of persons, and individual identification data showing a component value that indicates a facial feature of a person registered,
   said arithmetic processing unit executes the processing of
   (A) calculating a component value showing a facial feature of the person based on second image data showing the face of the person obtained by said camera and on said projection matrix data stored in said storage device,
   (B) determining whether or not individual identification data showing a component value generating an error smaller than a predetermined threshold value when compared with the component value calculated in said processing (A) is stored in said storage device, and
   (C) storing component value data showing the component value calculated in said processing (A), as individual identification data, into said storage device, when determining in said processing (B) that the individual identification data is not stored in said storage device, and
   said processing (B) is the processing of
   (B-1) determining a minimum value among respective errors, the respective errors being calculated by comparing the component value calculated in said processing (A) with said respective individual identification data stored in said storage device,
   (B-2) determining whether or not said minimum value determined in said processing (B-1) is equal to or more than the predetermined threshold value, and
   (B-3) determining that individual identification data showing a component value generating an error smaller than the predetermined threshold value when compared with the component value calculated in said processing (A) is not stored in said storage device, when determining in said processing (B-2) that said minimum value is equal to or more than the predetermined threshold value.

2. The individual identification data register according to claim 1, wherein
   said processing (A) is the processing of calculating a plurality of component values showing facial features of the person, based on said projection matrix data and on a plurality of said second image data showing the face of the person which have been obtained by capturing images using said camera at predetermined time intervals.

3. The individual identification data register according to claim 1, wherein said arithmetic processing device further executes the processing of
   (D) generating an individual-identification projection matrix based on the second image data showing the face of the person obtained by said camera, when determining in said processing (B) that individual identification data showing a component value generating an error smaller than the predetermined threshold value when compared with the component value calculated in said processing (A) is not stored in said storage device, and
   said processing (C) is the processing of
   storing component value data showing the component value calculated in said processing (A) and individual-identification projection matrix data showing the individual-identification projection matrix generated in said processing (D), as said individual identification data, into said storage device, when determining in said processing (B) that individual identification data showing a component value generating an error smaller than the predetermined threshold value when compared with the component value calculated in said processing (A) is not stored in said storage device.

4. The individual identification data register according to claim 3, wherein said arithmetic processing device repeatedly executes said processing (A) to (D) as one cycle, and further executes processing of (E) determining at predetermined time intervals whether or not persons being captured by said camera from a certain time point to a current time point are a same person, and said processing (C) is the processing of (C-1) storing component value data showing a component value calculated lastly out of component values calculated in said processing (A) and individual-identification projection matrix data showing an individual-identification projection matrix generated lastly out of the individual-identification projection matrices generated in processing (E), as individual identification data, into said storage device, when first determining in said processing (B) that individual identification data showing a component value generating an error smaller than the predetermined threshold value when compared with the component value calculated in said processing (A) is not stored in said storage device after having determined in said processing (E) that the persons being captured by said camera are not the same person, and (C-2) storing component value data showing a component value calculated lastly out of component values calculated in said processing (A) and individual-identification projection matrix data showing an individual-identification projection matrix generated lastly out of the individual-identification projection matrices generated in said processing (E) into said storage device, as new individual identification data, in place of individual identification data stored lastly out of the individual identification data stored in said storage device, when determining in said processing (B) that individual identification data showing a component value generating an error smaller than the predetermined threshold value when compared with the component value calculated in said processing (A) is not stored in said storage device in a state in which it is not determined that the persons being captured by said camera are not the same person after said processing (C-1).

5. The individual identification data register according to claim 1, wherein said arithmetic processing device repeatedly executes said processing (A) to (C) as one cycle, and further executes the processing of (E) determining at predetermined time intervals whether or not persons having been captured by said camera from a certain time point to a current time point are a same person, and said processing (C) is the processing of (C-1) storing component value data showing a component value calculated lastly out of component values calculated in said processing (A), as individual identification data, into said storage device, when first determining in said processing (B) that individual identification data showing a component value generating an error smaller than the predetermined threshold value when compared with the component value calculated in said processing (A) is not stored in said storage device after having determined in said processing (E) that the persons being captured by said camera are not the same person, and (C-2) storing component value data showing a component value calculated lastly out of the component values calculated in said processing (A) into said storage device, as new individual identification data, in place of individual identification data stored lastly out of the individual identification data stored in said storage device, when determining in said processing (B) that individual identification data showing a component value generating an error smaller than the predetermined threshold value when compared with the component value calculated in said processing (A) is not stored in said storage device in a state in which it is not determined that the persons being captured by said camera are not the same person after said processing (C-1).

6. The individual identification data register according to claim 5, wherein said arithmetic processing device further executes processing of (F) determining at predetermined time intervals whether or not the second image data obtained by said camera includes information showing the face of a person, and said processing (E) includes the processing of determining that persons being captured by said camera from a time point of said processing (C-1) to the current time point are the same person, when not determining in said processing (F) that the second image data does not include the information showing the face of the person, during the time between the time point of said processing (C-1) and the current time point.

7. The individual identification data register according to claim 5, wherein said arithmetic processing device further executes the processing of (G) measuring a weight applied to a seat for a person captured by said camera to sit, and said processing (E) includes the processing of determining whether or not persons being captured by said camera from a certain time point to the current time point are the same person, based on the weight measured in said processing (G).

8. The individual identification data register according to claim 5, wherein said individual identification data register is adjunctively installed in a gaming machine, and said processing (E) includes the processing of determining that persons being captured by said camera from a certain time point to the current time point are the same person, when a special game being a game relatively advantageous for the player is executed as a game to be executed in said gaming machine.

* * * * *